(12) United States Patent
Senoo et al.

(10) Patent No.: US 10,791,211 B2
(45) Date of Patent: Sep. 29, 2020

(54) DISPLAY CONTROLLING METHOD, TERMINAL, INFORMATION PROCESSING APPARATUS, AND STORAGE MEDIUM

(71) Applicant: LINE Corporation, Shibuya-ku, Tokyo (JP)

(72) Inventors: Shinobu Senoo, Tokyo (JP); Hiroyuki Miyajima, Tokyo (JP)

(73) Assignee: LINE CORPORATION, Tokyo (JP)

( * ) Notice: Subject to any disclaimer, the term of this patent is extended or adjusted under 35 U.S.C. 154(b) by 427 days.

(21) Appl. No.: 15/083,481

(22) Filed: Mar. 29, 2016

(65) Prior Publication Data

US 2017/0134561 A1 May 11, 2017

(30) Foreign Application Priority Data

Nov. 11, 2015 (JP) ................................ 2015-221042

(51) Int. Cl.
*H04M 1/725* (2006.01)
*G06F 3/0485* (2013.01)
*G06F 3/0482* (2013.01)

(52) U.S. Cl.
CPC ...... *H04M 1/72561* (2013.01); *G06F 3/0482* (2013.01); *G06F 3/0485* (2013.01); *H04M 1/72525* (2013.01); *G06F 2203/04803* (2013.01); *H04M 1/72522* (2013.01)

(58) Field of Classification Search
CPC .......... H04M 1/72561; H04M 1/72525; G06F 3/0482
See application file for complete search history.

(56) References Cited

U.S. PATENT DOCUMENTS

| 5,121,114 | A | 6/1992 | Nagasawa et al. |
| 2005/0138552 | A1* | 6/2005 | Venolia ................ G06Q 10/107 715/273 |
| 2005/0228814 | A1 | 10/2005 | Plow et al. |
| 2008/0155475 | A1* | 6/2008 | Duhig ................... G06F 3/0482 715/830 |
| 2010/0162168 | A1* | 6/2010 | Lee ...................... G06Q 10/107 715/821 |
| 2013/0132891 | A1 | 5/2013 | Lee |
| 2013/0139100 | A1 | 5/2013 | Horiike |
| 2014/0068654 | A1* | 3/2014 | Marlow .............. H04L 65/4084 725/28 |

(Continued)

FOREIGN PATENT DOCUMENTS

JP H0324594 A 2/1991
JP 2001-357291 A 12/2001
(Continued)

OTHER PUBLICATIONS

Korean Office Action dated Dec. 11, 2019 issued in corresponding Korean Patent Application No. 10-2018-7012505.

*Primary Examiner* — Stella Higgs
(74) *Attorney, Agent, or Firm* — Harness, Dickey & Pierce, P.L.C.

(57) ABSTRACT

A display controlling method includes displaying content in a first display area on a screen of a terminal; determining whether the content is viewed; and moving the content from the first display area to a second display area in order to display the content if it is determined that the content is not viewed.

15 Claims, 17 Drawing Sheets

(56) References Cited

U.S. PATENT DOCUMENTS

| | | | | |
|---|---|---|---|---|
| 2015/0264312 A1* | 9/2015 | Chastney | ............... | H04N 7/148 |
| | | | | 715/719 |
| 2016/0088101 A1* | 3/2016 | Batiste | .................... | H04L 67/22 |
| | | | | 709/224 |
| 2016/0170584 A1* | 6/2016 | Kumar | .................... | G06F 3/013 |
| | | | | 715/811 |
| 2016/0191429 A1* | 6/2016 | Lee | .................... | G06F 3/04817 |
| | | | | 715/752 |

FOREIGN PATENT DOCUMENTS

| | | |
|---|---|---|
| JP | 2002-149332 A | 5/2002 |
| JP | 2005-182603 A | 7/2005 |
| JP | 2007-213481 A | 8/2007 |
| JP | 2007-531128 A | 11/2007 |
| JP | 2014-531098 A | 11/2014 |
| JP | 2015-069514 A | 4/2015 |
| KR | 10-2012-0124817 A | 11/2012 |
| KR | 10-2014-0125672 A | 10/2014 |

* cited by examiner

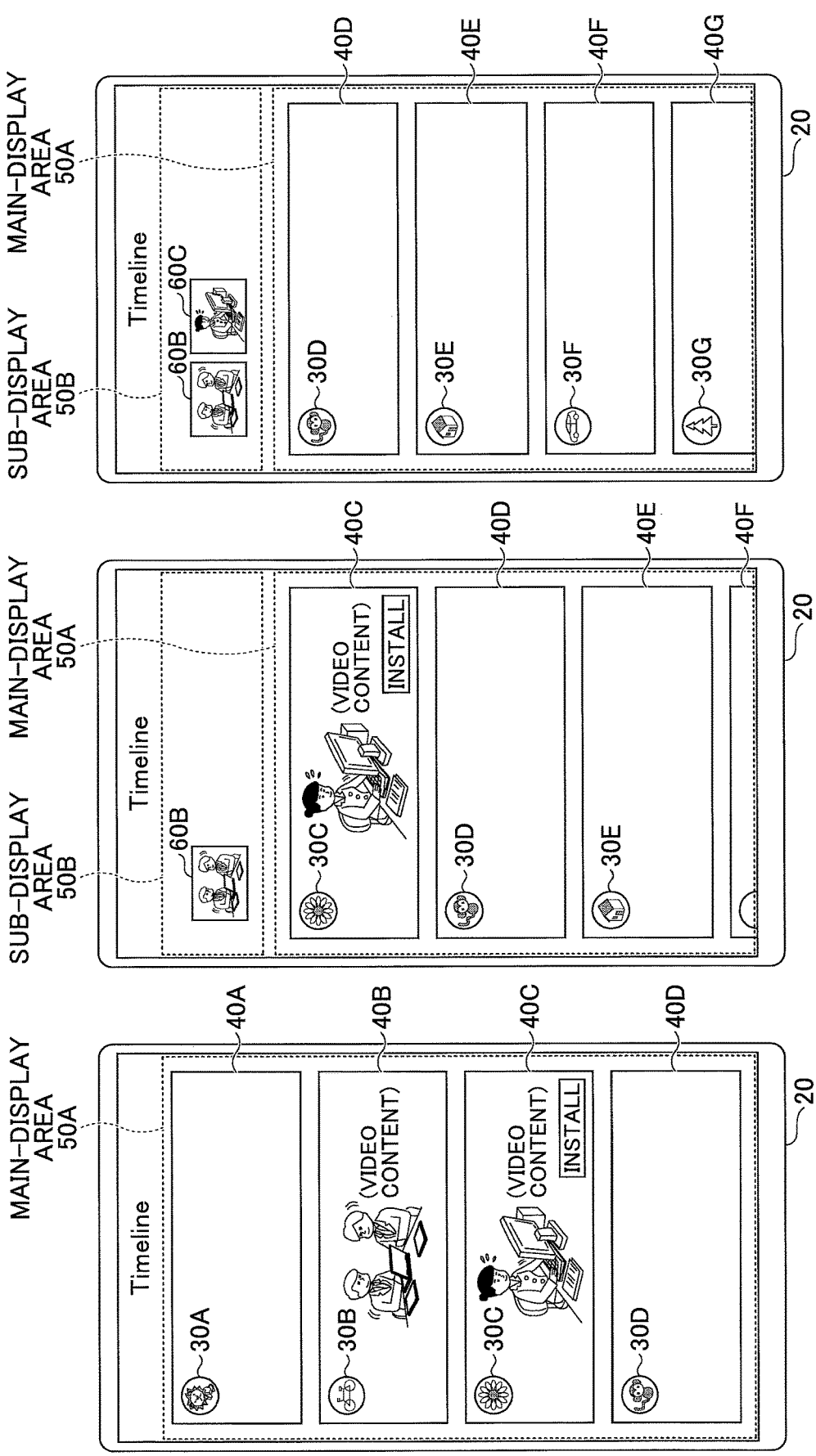

| DATE OF BIRTH | SEX | RESIDENTIAL AREA | FRIEND INFORMATION | MATTER OF INTEREST 1 | MATTER OF INTEREST 2 | ... |
|---|---|---|---|---|---|---|
| 1977/6/xx | MAN | YOKOHAMA | MMM | EUROPEAN FOOTBALL | STOCK INVESTMENT | ... |

| DISPLAY ORDER | CONTENT ID | CONTENT TYPE | DISPLAY STATE | DISPLAY NUMBER | BROWSING STATE |
|---|---|---|---|---|---|
| 1 | XXX | VIDEO ADVERTISEMENT | DISPLAYED | TWICE | BROWSED |
| 2 | YYY | USER POST (VIDEO) | BEING DISPLAYED IN SUB-DISPLAY AREA | ONCE | BEING BROWSED |
| 3 | ZZZ | VIDEO ADVERTISEMENT | BEING DISPLAYED IN MAIN-DISPLAY AREA | ONCE | NOT BROWSED |
| 4 | PPP | USER POST (STILL IMAGE) | BEING DISPLAYED IN MAIN-DISPLAY AREA | ONCE | BEING BROWSED |
| 5 | QQQ | VIDEO ADVERTISEMENT | NOT DISPLAYED | ZERO | NOT BROWSED |
| ... | ... | ... | ... | ... | ... |

| | SIZE (UPPER LIMIT TO LOWER LIMIT) | NUMBER OF CONTENT DISPLAY (UPPER LIMIT) | DISPLAY SIZE OF CONTENT |
|---|---|---|---|
| MAIN-DISPLAY AREA SETTING INFORMATION | XXX-YYY | 10 | AAA-BBB |
| SUB-DISPLAY AREA SETTING INFORMATION | PPP-QQQ | 3 | CCC-DDD |

FIG.8

| CONTENT ID | CONTENT TYPE | SOURCE | BROWSING DETERMINATION METHOD | DISPLAY METHOD | DISTRIBUTION TARGET | DISTRIBUTION PERIOD | DISTRIBUTION NUMBER (UPPER LIMIT) |
|---|---|---|---|---|---|---|---|
| XXX | VIDEO ADVERTISEMENT | COMPANY X | VIDEO REPLAY FOR 15 SECONDS OR MORE; SELECTION OF INSTALLATION LINK OR SELECTION OF SHARE MENU | MAIN-DISPLAY AREA AND SUB-DISPLAY AREA | MALE IN HIS 20S | 2015/6/1 – 2015/10/1 | 10 TIMES/ USER |
| YYY | USER POST (VIDEO) | USER C | VIDEO REPLAY FOR 10 SECONDS OR MORE | MAIN-DISPLAY AREA | POST GROUP X | NA | NA |
| ZZZ | VIDEO ADVERTISEMENT | COMPANY Z | VIEW 50% OR MORE | MAIN-DISPLAY AREA AND SUB-DISPLAY AREA | MALE IN HIS 30S FEMALE IN HER 30S | 2015/9/1 – 2015/12/1 | 5 TIMES/ USER |
| PPP | USER POST (STILL IMAGE) | USER D | DISPLAY FOR 2 SECONDS OR MORE | MAIN-DISPLAY AREA | READERS OF TIMELINE OF USER D | NA | NA |
| QQQ | VIDEO ADVERTISEMENT | COMPANY Q | DISPLAY FOR 10 SECONDS OR MORE | MAIN-DISPLAY AREA AND SUB-DISPLAY AREA | YOKOHAMA AREA | 2015/10/15 – 2015/12/10 | 3 TIMES/ USER |
| RRR | STILL IMAGE ADVERTISEMENT | COMPANY R | DISPLAY FOR 3 SECONDS OR MORE; SELECTION OF INSTALLATION LINK OR SELECTION OF SHARE MENU | MAIN-DISPLAY AREA AND SUB-DISPLAY AREA | FEMALE IN HER TEENS | 2015/10/15 – 2015/12/20 | TWICE/ USER |

130D

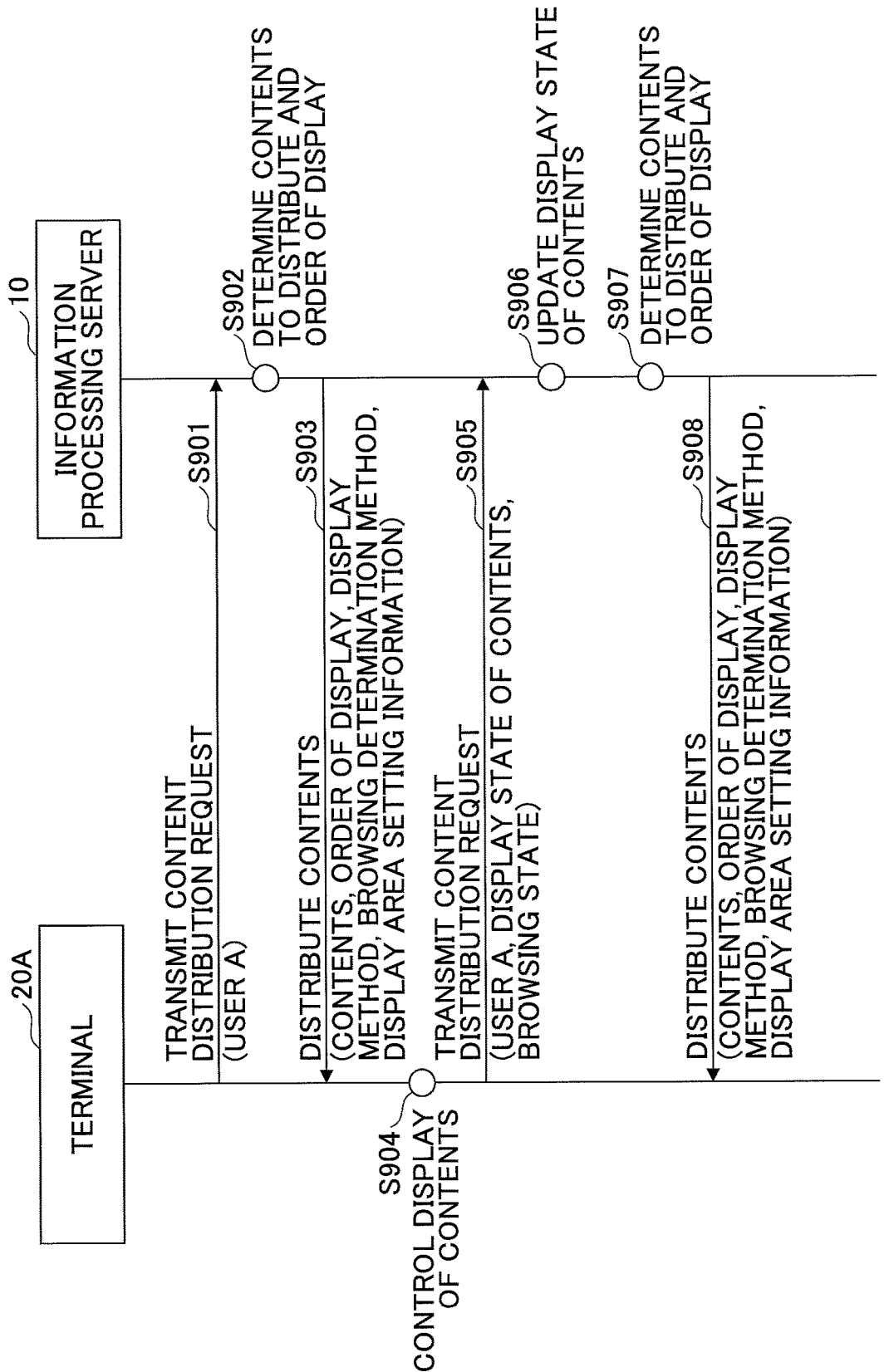

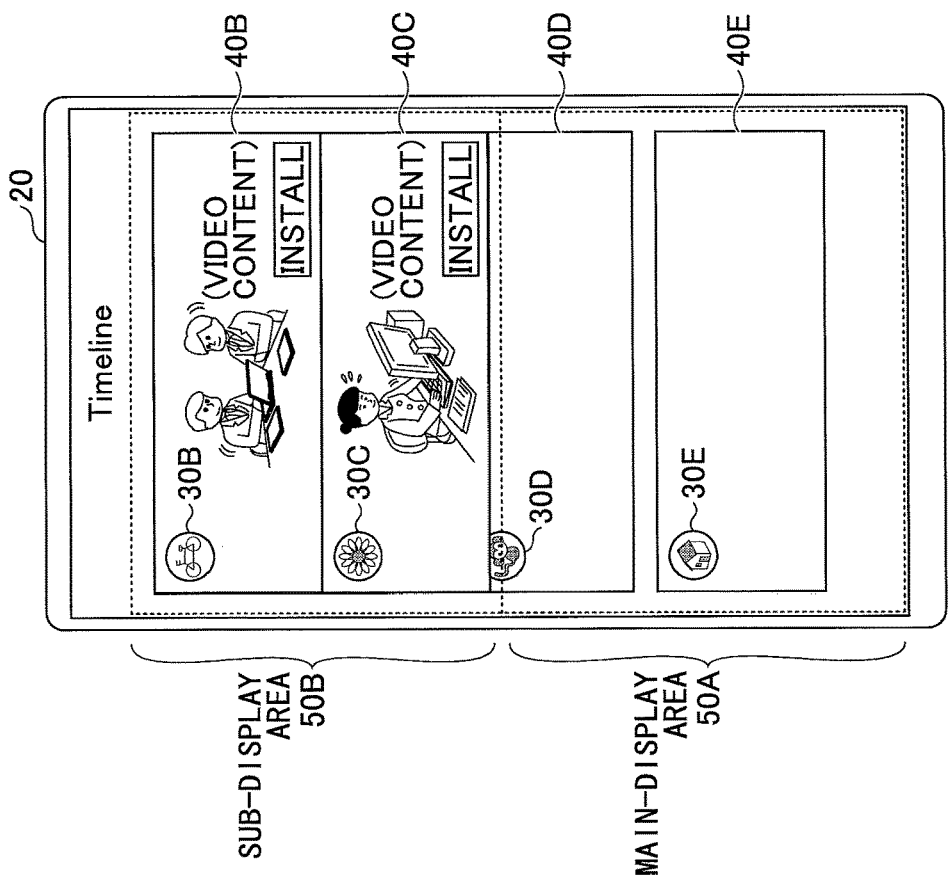
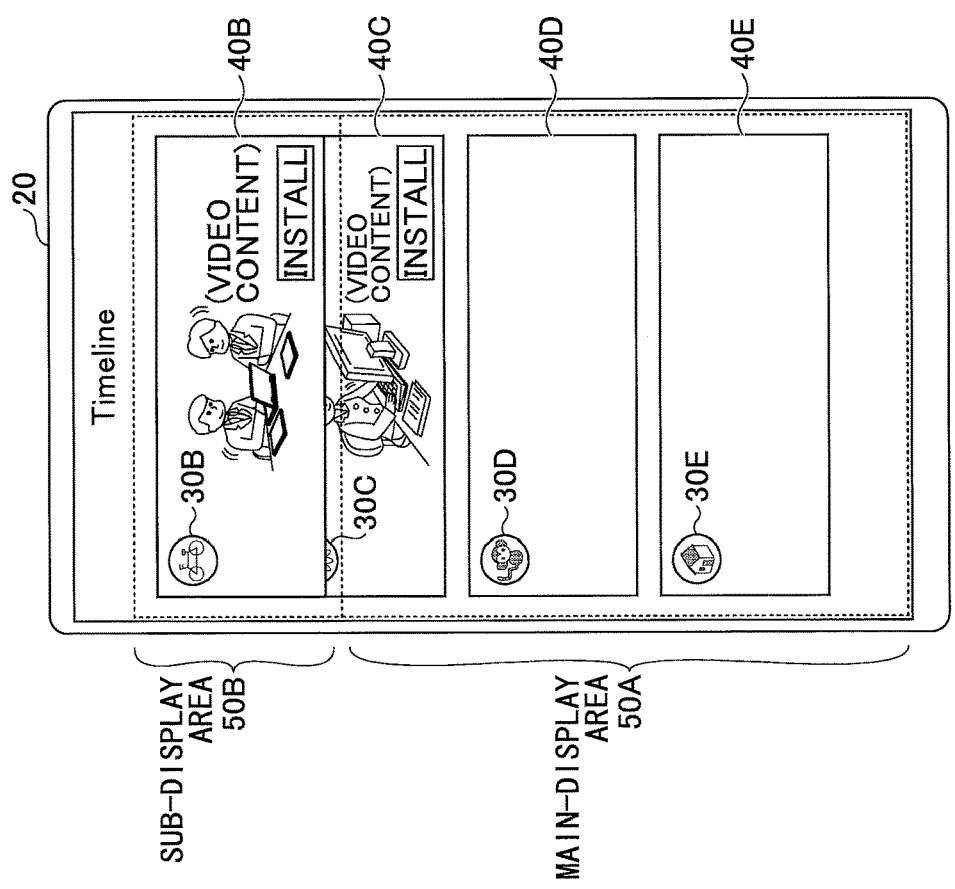

| CONTENT ID | CONTENT TYPE | SOURCE | BROWSING DETERMINATION METHOD | DISPLAY METHOD | DISTRIBU- TION TARGET | DISTRIBU- TION PERIOD | DISTRIBU- TION NUMBER (UPPER LIMIT) | DISPLAY FORM ||||
|---|---|---|---|---|---|---|---|---|---|---|---|
| | | | | | | | | 1 | 2 | 3 | ... N |
| XXX | VIDEO ADVER- TISEMENT | COMPANY X | VIDEO REPLAY FOR 15 SECONDS OR MORE; SELECTION OF INSTALLATION LINK OR SELECTION OF SHARE MENU | MAIN-DISPLAY AREA AND SUB-DISPLAY AREA | MALE IN HIS 20S | 2015/6/1 – 2015/10/1 | 10 TIMES/ USER | XX | YY | ZZ | ... NN |
| YYY | USER POST (VIDEO) | USER C | VIDEO REPLAY FOR 10 SECONDS OR MORE | MAIN-DISPLAY AREA | POST GROUP X | NA | NA | XX | YY | KK | ... ZZ |
| ZZZ | VIDEO ADVER- TISEMENT | COMPANY Z | VIEW 50% OR MORE | MAIN-DISPLAY AREA AND SUB-DISPLAY AREA | MALE IN HIS 30S FEMALE IN HER 30S | 2015/9/1 – 2015/12/1 | 5 TIMES/ USER | PP | NN | JJ | ... XX |
| PPP | USER POST (STILL IMAGE) | USER D | DISPLAY FOR 2 SECONDS OR MORE | MAIN-DISPLAY AREA | READERS OF TIMELINE OF USER D | NA | NA | XX | ZZ | YY | ... KK |
| QQQ | VIDEO ADVER- TISEMENT | COMPANY Q | DISPLAY FOR 10 SECONDS OR MORE | MAIN-DISPLAY AREA AND SUB-DISPLAY AREA | YOKOHAMA AREA | 2015/10/15 – 2015/12/10 | 3 TIMES/ USER | XX | ZZ | YY | ... MM |
| RRR | STILL IMAGE ADVER- TISEMENT | COMPANY R | DISPLAY FOR 3 SECONDS OR MORE; SELECTION OF INSTALLATION LINK OR SELECTION OF SHARE MENU | MAIN-DISPLAY AREA AND SUB-DISPLAY AREA | FEMALE IN HER TEENS | 2015/10/15 – 2015/12/20 | TWICE/ USER | ZZ | TT | YY | ... JJ |

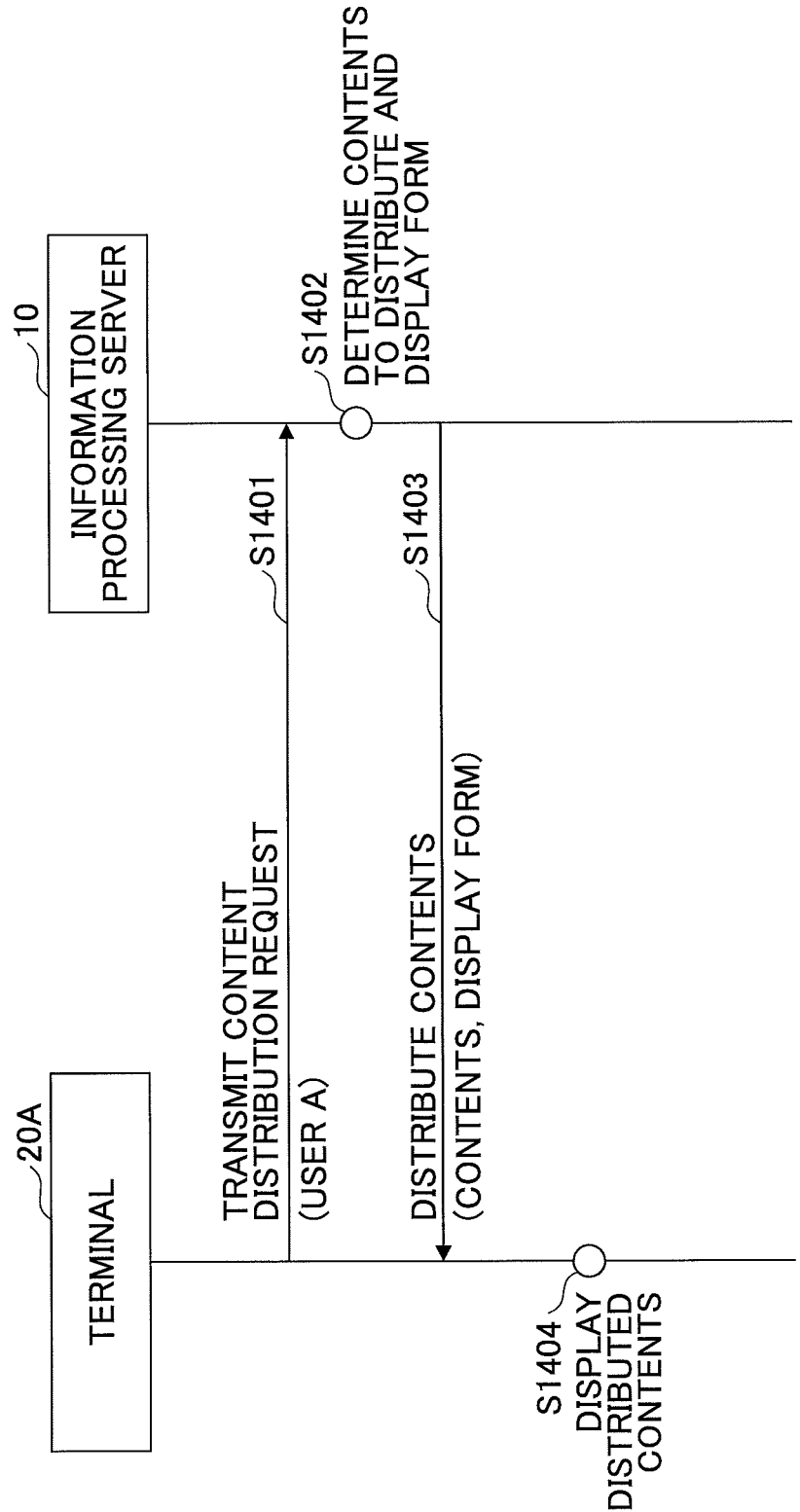

DISPLAY CONTROLLING METHOD, TERMINAL, INFORMATION PROCESSING APPARATUS, AND STORAGE MEDIUM

BACKGROUND OF THE INVENTION

1. Field of the Invention

The present invention relates to a display controlling method, a terminal, an information processing apparatus, and a storage medium.

2. Description of the Related Art

Users of terminals, such as smartphones, confirm content distributed to the terminals by scrolling the screen of the terminals. When the user scrolls the screen of the terminal and confirms the presence of desired content, the user selects the content. The terminal displays detailed information of the selected content and replays a video of the content, for example.

It takes time for the user to confirm a specific one of many contents through an operation such as scrolling. Accordingly, there is a method for displaying content in a distinguishable manner if the content satisfies a specific condition (Patent Document 1, for example).

However, such a method does not display content in a distinguishable manner based on whether displayed content has been browsed. When content such as advertisement or posts from users of a social network service is distributed to a terminal connected to the Internet, it is important for a source of content to prompt the user to browse content that has not been browsed and improve the browsing rate for the content.

RELATED ART DOCUMENTS

[Patent Document 1] Japanese Laid-Open Patent Application No. 2013-114559

SUMMARY OF THE INVENTION

It is an object of at least one embodiment of the present invention to prompt a user to browse content that has not been browsed among contents displayed in a terminal.

In an embodiment, a display controlling method is provided. The display controlling method includes displaying content in a first display area on a screen of a terminal; determining whether the content is viewed; and moving the content from the first display area to a second display area in order to display the content if it is determined that the content is not viewed.

BRIEF DESCRIPTION OF THE DRAWINGS

Other objects and further features of embodiments will become apparent from the following detailed description when read in conjunction with the accompanying drawings, in which:

FIG. 2A is a diagram depicting a screen display (first example) of a terminal in an information processing system according to the first embodiment;

FIG. 2B is a diagram depicting a screen display (first example) of the terminal in an information processing system according to the first embodiment;

FIG. 2C is a diagram depicting a screen display (first example) of the terminal in an information processing system according to the first embodiment;

FIG. 7A is a diagram depicting a user attribute table stored in an information storage unit according to the first embodiment;

FIG. 7B is a diagram depicting a content distribution state table stored in the information storage unit according to the first embodiment;

FIG. 7C is a diagram depicting a display area setting table stored in the information storage unit according to the first embodiment;

FIG. 8 is a diagram depicting a content distribution target table according to the first embodiment;

FIG. 9 is a sequence diagram of an operation according to the first embodiment;

FIG. 11A is a diagram depicting a screen display (third example) of the terminal according to the first embodiment;

FIG. 11B is a diagram depicting a screen display (third example) of the terminal according to the first embodiment;

FIG. 13 is a diagram depicting a content distribution target table according to a second embodiment;

FIG. 14 is a sequence diagram of an operation according to the second embodiment;

DESCRIPTION OF THE PREFERRED EMBODIMENTS

In the following, embodiments of the present invention will be described in detail.

First Embodiment

<Outline>

Figure 1:
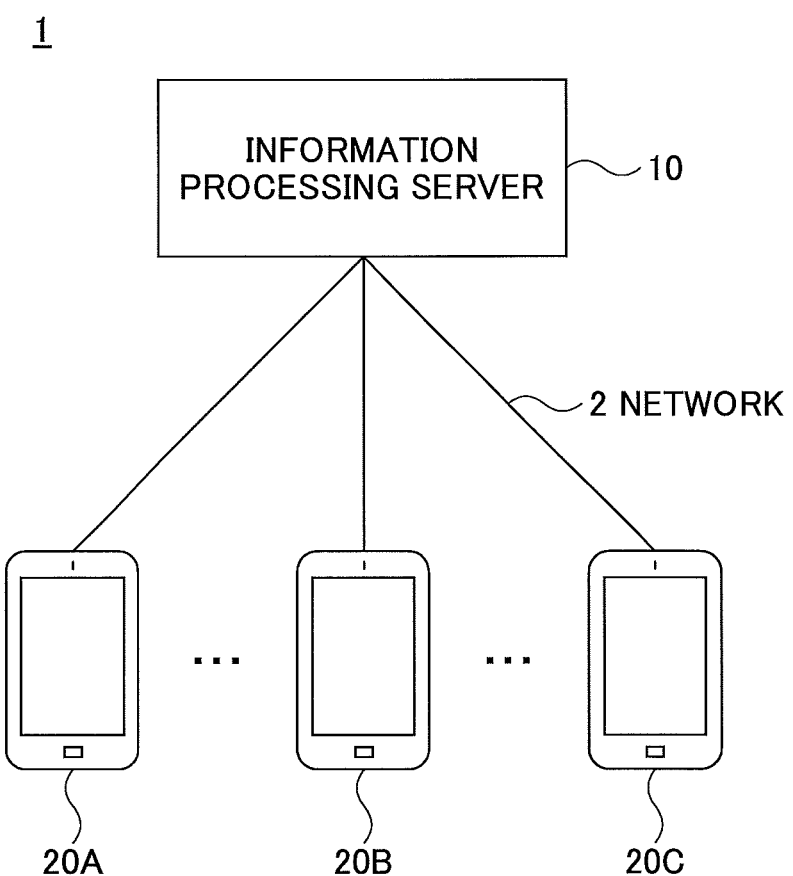
FIG. 1 is a diagram of a system configuration of an information processing system according to a first embodiment.

FIG. 1 is a diagram of a system configuration of an information processing system 1 according to the first embodiment. The information processing system 1 includes an information processing server 10 and a plurality of terminals 20 (a terminal 20A, a terminal 20B, and a terminal 20C). The information processing server 10 and the terminals 20 are connected via a network 2. The network 2 includes a wired network and a wireless network.

Examples of the terminal 20 include a smartphone, a tablet terminal, a Personal Computer (PC), a mobile phone, a game console, a touchpad, an electronic book reader, and a wearable terminal.

The information processing server 10 provides Social Network Service (SNS) to a user of the terminal 20. The user of the terminal 20 can receive services of the SNS from the information processing server 10 by installing an application of the SNS in the terminal 20 and connecting the terminal 20 to the information processing server 10.

While a display controlling method in the services of the SNS is mainly described in the following embodiment, the display controlling method can be applied to display of content on the terminal 20 of the user. For example, the display controlling method can be applied to content in various types of websites on the Internet, for example.

The terminal 20 may use a web browser or the like to connect to the information processing server 10 and receive the services of the SNS.

The information processing server 10 provides a timeline service as one of the services of the SNS, for example.

The timeline service refers to a service by which the information processing server 10 causes the terminal 20 of the user to display content such as text, pictures, and videos in chronological order, the content being posted on the SNS by the user or other users related to the user on the SNS. The information processing server 10 displays advertisement (hereafter "advertisement content") provided by an advertiser between contents (hereafter "user content") posted by the users of the SNS.

The information processing server 10 distributes a plurality of user contents and advertisement contents to the terminal 20. The terminal 20 displays the user contents and the advertisement contents on the screen of the terminal 20 in display order specified by the information processing server 10. Because the size of the screen is limited, the terminal 20 cannot simultaneously display all the distributed contents on the screen.

The terminal 20 receives an operation from the user, such as a scrolling operation on the screen, and changes contents to display.

For example, if the information processing server 10 distributes M contents (user contents and advertisement contents) to the terminal 20, the first to N-th contents are displayed on the terminal 20 (M and N are natural numbers, N<M). If the terminal 20 receives an instruction to display from the N-th content from the user as a result of a scrolling operation in a first direction (downward direction on the screen, for example), the terminal 20 displays the second to N+1-th or the third to N+3-th contents. In this manner, the terminal 20 displays new contents by removing (deleting) a part of contents being displayed on the screen.

Operators of SNS and advertisers that provide advertisement contents wish to have the users browse contents that attract a lot of attention from other users and the advertisement contents for a predetermined time or more. For example, the advertisers wish to have the users browse the advertisement contents for a predetermined time or more to improve advertisement effects.

The terminal 20 according to the embodiment has a display area 50 including a main-display area 50A that displays contents on the screen in accordance with an instruction from the information processing server 10 and a sub-display area 50B that displays contents to be preferably browsed by the user of the terminal 20.

The terminal 20 measures and stores a period of time when each content is displayed on the screen. Further, if the content is a video, the terminal 20 measures and stores a replay time of the video content. In addition, such a measured period of time may be expressed as a browsing time.

If the browsing time of the content exceeds a predetermined time set for each content, the terminal 20 determines that the content is browsed.

In a case where the browsing time of the content exceeds the predetermined time, when the terminal 20 receives an instruction to display new contents from the user as a result of scrolling in the first direction, such content is removed from the screen (deleted from the screen).

By contrast, in a case where the browsing time of the content does not exceed the predetermined time, when the terminal 20 receives an instruction to display new contents from the user as a result of scrolling in the first direction, such content is displayed in the sub-display area 50B.

The sub-display area 50B is a display area where contents or the like are fixedly displayed even if the terminal 20 receives a scrolling operation or the like from the user to change display of contents on the screen. In the sub-display area 50B, the same contents are fixedly displayed for a predetermined period. By contrast, in the main-display area 50A, if an operation to change display of contents on the screen is received from the user, contents to display are changed. In other words, the main-display area 50A is a display area where contents and the like are dynamically displayed.

FIGS. 2A to 2C are diagrams depicting a screen display (first example) of the terminal 20 in the information processing system 1 according to the first embodiment.

FIG. 2A shows that contents distributed by the information processing server 10 are displayed in the main-display area 50A in accordance with an order specified by the information processing server 10. In the main-display area 50A, the first to fourth contents (content 40A, content 40B, content 40C, and content 40D) are displayed.

FIG. 2B shows that a scrolling operation in the first direction is received from the user on the screen of the terminal 20 and the third to fifth contents (content 40C, content 40D, and content 40E) are displayed in the main-display area 50A. The content 40A is removed from the screen, while the content 40B is displayed in the sub-display area 50B because the content 40B has not been browsed by the user for a predetermined browsing time or more set in the content 40B. A display space of the sub-display area 50B is limited, so that the content 40B is reduced and displayed as content 60B. A thumbnail of the content is displayed for the content 60B.

The sub-display area 50B may be set in advance on the screen. Alternatively, the main-display area 50A may be reduced in response to occurrence of content to display in the sub-display area 50B and the sub-display area 50B may be set in an area that becomes available as a result of the reduction of the main-display area 50A.

FIG. 2C shows that a scrolling operation in the first direction is further received from the user on the screen of the terminal 20 and the fourth to seventh contents (content 40D, content 40E, content 40F, and content 40G) are displayed in the main-display area 50A. The content 40C is displayed in the sub-display area 50B because the content 40C has not been browsed by the user for a predetermined browsing time or more set in the content 40C. The content 40C is reduced and displayed as content 60C in the same manner as the content 40B.

Figure 3A:
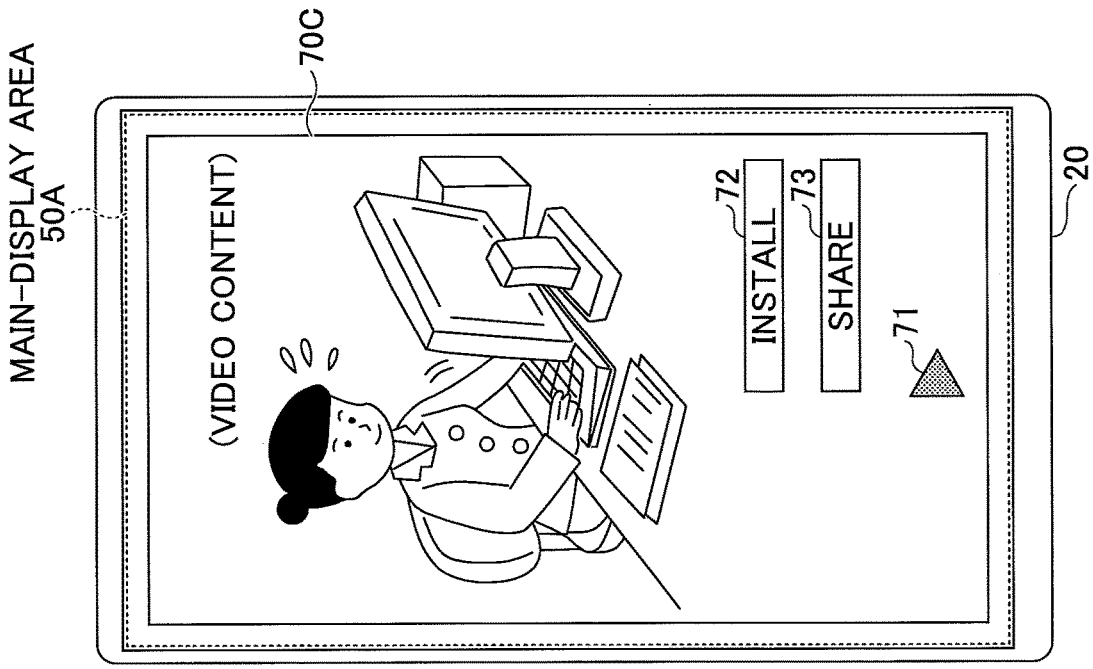
FIG. 3A is a diagram depicting a screen display (second example) of the terminal in an information processing system according to the first embodiment.
Figure 3B:
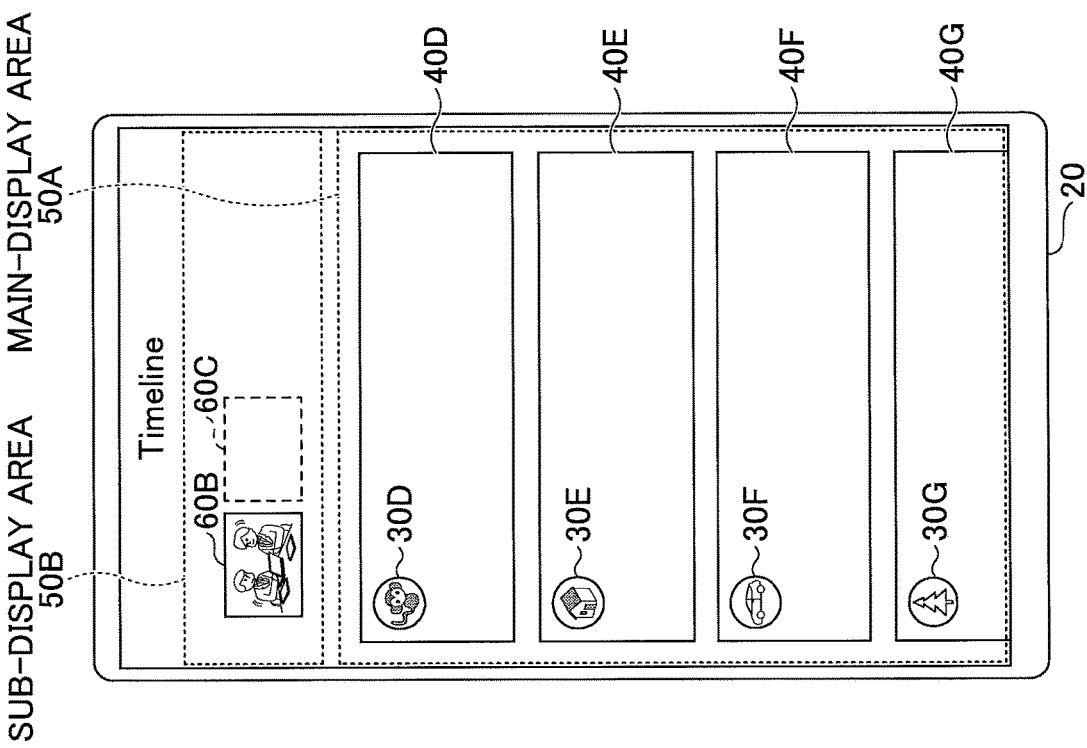
FIG. 3B is a diagram depicting a screen display (second example) of the terminal in an information processing system according to the first embodiment.

FIGS. 3A and 3B are diagrams depicting a screen display (second example) of the terminal 20 in the information processing system 1 according to the first embodiment.

Content displayed in the sub-display area 50B is enlarged and displayed if the terminal 20 receives selection of the user.

FIG. 3A shows that the terminal 20 receives selection of the content 60C by the user, the content 60C being displayed in the sub-display area 50B in FIG. 2C.

When the selection of the content 60C that has been reduced and displayed is received, the content 60C is enlarged and displayed as content 70C on the screen of the terminal 20. In the following description, the content 70C is assumed to be video content.

When an operation for the content 70C is received, the terminal 20 performs an operation in response to the operation. For example, if a replay menu 71 of the content 70C is selected, the terminal 20 starts replaying the content. If an installation link 72 of the content 70C is selected, the terminal 20 connects to a website on the Internet to install an application related to the content 70C or starts up an application to install the application related to the content 70C. If a share menu 73 of the content 70C is selected, the terminal 20 sends, to the information processing server 10, an instruction to report that the content 70C is browsed to users related to the user of the terminal 20 on the services of the SNS. In addition, the users related to the user of the terminal 20 on the services of the SNS refer to users set as friends, for example.

If the video is replayed for a predetermined time or more, the installation link 72 is selected, or the share menu 73 is selected, the terminal 20 determines that the content 70C is browsed and removes the content 60C from the sub-display area 50B, the content 60C being a reduced version of the content 70C.

FIG. 3B shows that the content 60C is removed from the sub-display area 50B.

As described above, if it is determined that content has not been browsed, the content is reduced and displayed in the sub-display area 50B. In addition, because the display space of the sub-display area 50B is also limited, the terminal 20 may remove content being displayed for a predetermined time or more in the sub-display area 50B. Further, if there is no available space in the sub-display area 50B upon displaying new content in the sub-display area 50B, the terminal 20 may remove content having the oldest time among contents being displayed in the sub-display area 50B or the terminal 20 may reduce the size of each content being displayed in the sub-display area 50B and display new content in the sub-display area 50B.

In the above embodiment, the contents are fixedly displayed in the sub-display area 50B. However, the contents being displayed in the sub-display area 50B may be displayed in the main-display area 50A when the terminal 20 receives an operation on the main-display area 50A from the user.

For example, when a scrolling operation in a second direction opposite to the first direction is received on the screen of the terminal 20 and the content 40B and the content 40D displayed before and after the content 60C being displayed in the sub-display area 50B are displayed on the screen again, the content 60C may be removed from the sub-display area 50B and the content 40C may be displayed between the content 40B and the content 40D in the same display form as previously performed.

In this case, the user feels like the content 60C being displayed in the sub-display area 50B returns to the main-display area 50A and is displayed as the content 40C.

In addition, display order of contents is changed at a given time by an instruction from the information processing server 10. For example, each time the screen of the terminal 20 is scrolled, the display order of user contents and advertisement contents may be dynamically changed.

Although the terminal 20 determines the display in the sub-display area 50B in the above description, the information processing server 10 may determine the display. In this case, the terminal 20 stores a browsing time of each content and reports the browsing time to the information processing server 10. The information processing server 10 determines whether the reported browsing time of content exceeds a predetermined browsing time set in each content.

The terminal 20 may perform a process to display a boundary between the display areas, set different colors for the backgrounds of the display areas, or set different gradation for the backgrounds of the display areas, for example, such that the user can recognize the main-display area 50A and the sub-display area 50B.

An operation other than scrolling may be received to change contents to display as a matter of course.

<Hardware Configuration>

In the following, a hardware configuration of each device included in the information processing system 1 is described.

(1) Information Processing Server

The information processing server 10 has a configuration of a typical computer.

Figure 4:
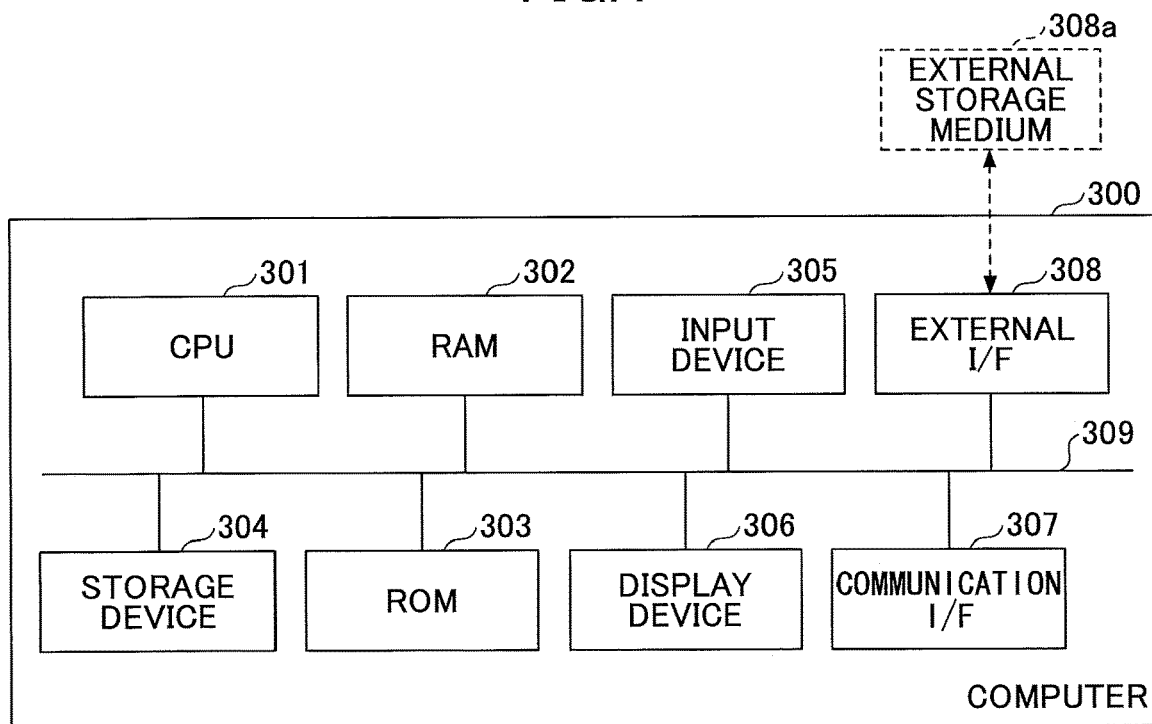
FIG. 4 is a diagram of a hardware configuration of a computer according to the first embodiment.

FIG. 4 is a diagram of a hardware configuration of the computer according to the first embodiment. In FIG. 4, a computer 300 includes a Central Processing Unit (CPU) 301, a Random Access Memory (RAM) 302, a Read Only Memory (ROM) 303, a storage device 304, an input device 305, a display device 306, a communication Interface (I/F) 307, an external I/F 308, a bus 309, and the like.

The CPU 301 includes an arithmetic unit that realizes control and functions of the computer 300 by reading a program or data onto the RAM 302 from a memory such as the ROM 303 or the storage device 304 and executing a process. The ROM 303 stores settings of a Basic Input/Output System (BIOS) and an Operating System (OS) executed when the computer 300 starts, programs, and data such as various types of settings. The RAM 302 includes a volatile memory that temporarily stores programs and data. The storage device 304 includes a large-capacity storage device that stores programs and data.

Examples of the input device 305 include a keyboard, a mouse, and the like. The input device 305 is used by the user to input various types of operation signals. Examples of the display device 306 include a display screen. The display device 306 displays a result of a process performed by the computer 300. In addition, the input device 305 and/or the display device 306 may be connected and used when necessary.

The communication I/F 307 includes an interface to connect the computer 300 to the network 2. The external I/F 308 includes an interface for an external device. Examples of the external device include an external storage medium 308a. In accordance with this, the computer 300 can read and/or write on the external storage medium 308a via the external I/F 308. Examples of the external storage medium 308a include various types of optical disks and various types of memory cards When the CPU 301 executes a program stored in the ROM 303 or the like, it is possible to implement functions of the information processing server 10.

(2) Terminal

Figure 5:
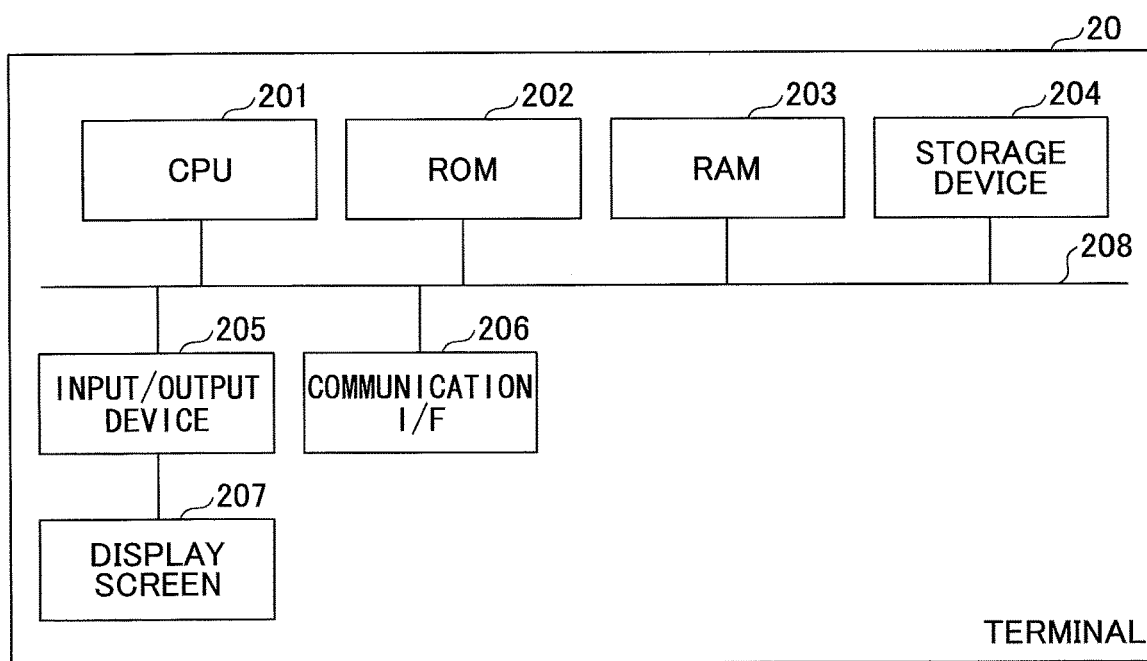
FIG. 5 is a diagram of a hardware configuration of a terminal according to the first embodiment.

FIG. 5 is a diagram of a hardware configuration of the terminal 20 according to the first embodiment.

The terminal 20 includes a CPU 201, a ROM 202, a RAM 203, a storage device 204, an input/output device 205, a communication I/F 206, and a display screen (display device) 207. In addition, constituent elements of the hardware of the terminal 20 are interconnected via a bus 208.

The storage device 204 stores various types of programs. The CPU 201 includes a computer that executes various types of programs stored in the storage device 204.

The ROM 202 includes a non-volatile memory. The ROM 202 stores various types of programs, data, and the like necessary for the CPU 201 to execute various types of programs stored in the storage device 204.

The RAM 203 includes a main storage device such as a Dynamic Random Access Memory (DRAM) or a Static Random Access Memory (SRAM). The RAM 203 functions as a work area where various types of programs are loaded when executed by the CPU 201.

The input/output device 205 includes functions of an input device that inputs various types of instructions into the terminal 20 and an output device that outputs a result of a process performed in the terminal 20. The input/output device 205 is connected to the display screen 207. In the embodiment, the display screen 207 may include a touch-reactive display screen (touch panel). The communication I/F 206 performs communication between the terminal 20 and the information processing server 10 via the network 2.

When the CPU 201 executes a program stored in the storage device 204 or the like, it is possible to implement functions of the terminal 20.

<Functional Configuration>

Figure 6:
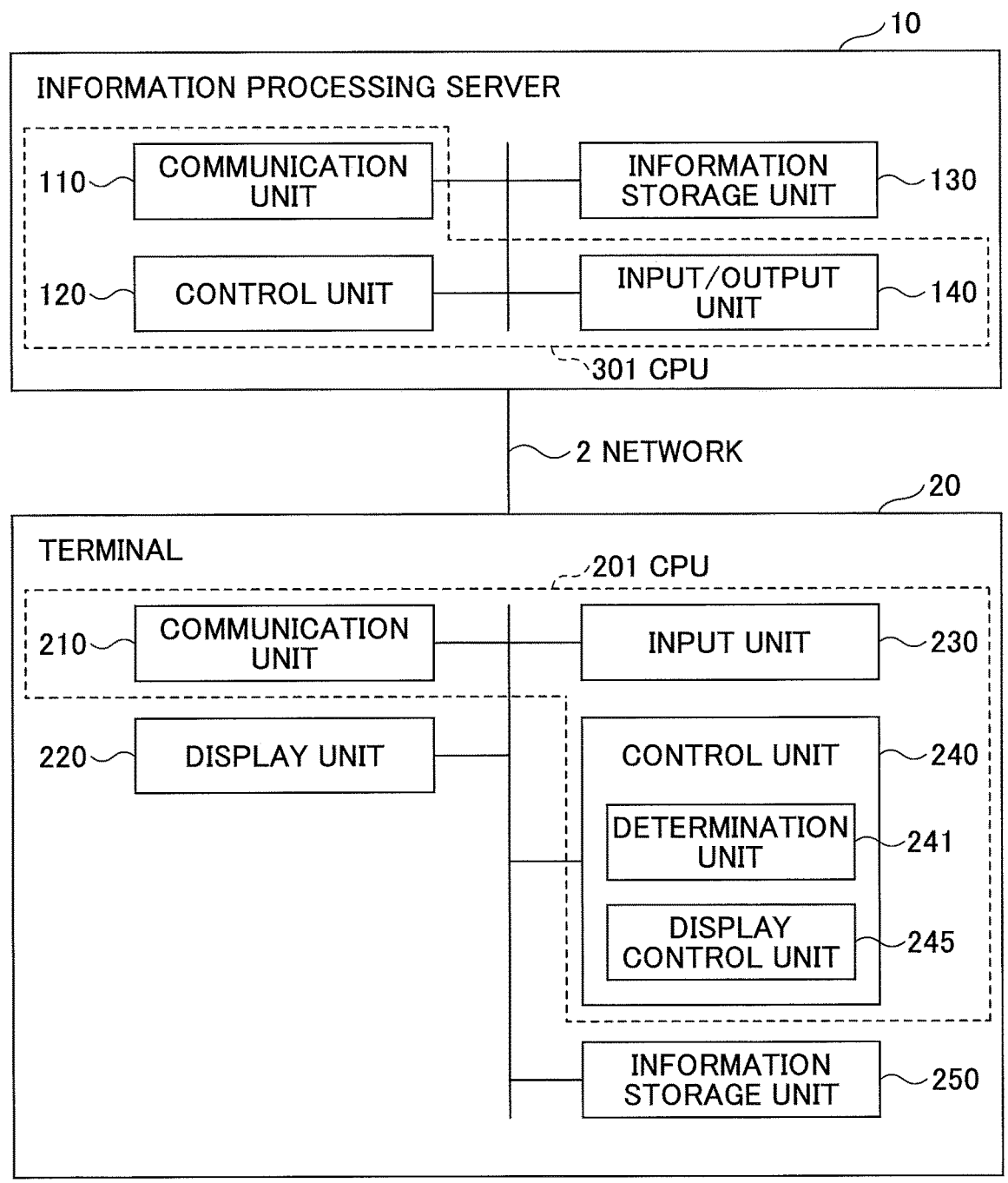
FIG. 6 is a diagram of a functional configuration of an information processing system according to the first embodiment.

FIG. 6 is a diagram of a functional configuration of the information processing system 1 according to the first embodiment. With reference to FIG. 6, the functional configurations of the information processing server 10 and the terminal 20 are described.

(1) Information Processing Server

The information processing server 10 includes a communication unit 110, a control unit 120, an information storage unit 130, and an input/output unit 140. The information processing server 10 includes the CPU 301 and a memory such as the ROM 303 or the storage device 304 working in cooperation with each other so as to implement the communication unit 110, the control unit 120, the information storage unit 130, and the input/output unit 140.

Specifically, functions of the information processing server 10 work in cooperation with one another as follows. The communication unit 110 distributes content to the terminal 20. The communication unit 110 also reports, to the terminal 20, a browsing determination method as a condition to determine whether content has been browsed. If it is determined that the content has not been browsed, the control unit 120 controls the terminal 20 to display the content in a display form different from a previous display of the content.

The communication unit 110 distributes content to the terminal 20 based on an instruction of the control unit 120. When the communication unit 110 distributes the content, the communication unit 110 also reports display order of the content, a method for determining whether the content is browsed or (browsing determination method), and setting information of the display area 50.

The communication unit 110 receives a display state of content from the terminal 20 and reports the display state of content to the information storage unit 130.

The control unit 120 refers to a user attribute table 130A, a content distribution state table 130B, and a content distribution target table 130D stored in the information storage unit 130 and determines display order of user contents and advertisement contents to display on the terminal 20 of the user. Information elements stored in the user attribute table 130A, the content distribution state table 130B, and the content distribution target table 130D are described later.

The control unit 120 sends an instruction to display contents in the determined display order to the terminal 20 via the communication unit 110. The control unit 120 displays the user contents in chronological order on the terminal 20 while inserting the advertisement contents between the user contents and displaying the advertisement contents. The advertisement contents are dynamically inserted between the user contents in order to attract attention of the user to the advertisement contents. Further, as to the user contents, actual contents to display in chronological order are dynamically changed based on posts from the terminal 20 of the user or another terminal 20 from another user, for example. In addition, the user contents may be called user information.

The control unit 120 reports the "browsing determination method" as an information element to determine whether corresponding content has been browsed to the terminal 20 via the communication unit 110.

The control unit 120 reports, to the terminal 20 via the communication unit 110, a "display method" as an information element for the terminal 20 to determine the display area 50 for each content. Further, the control unit 120 reports, to the terminal 20 via the communication unit 110, "main-display area setting information" and "sub-display area setting information" as information about formation of the main-display area 50A and the sub-display area 50B.

The "main-display area setting information" and "sub-display area setting information" are stored in a display area setting table 130C for each user in the information storage unit 130.

The control unit 120 receives a display state of content via the communication unit 110. The control unit 120 updates the content distribution state table 130B based on the received display state of content.

The information storage unit 130 stores the user attribute table 130A, the content distribution state table 130B, the display area setting table 130C, and the content distribution target table 130D. The information storage unit 130 allows the control unit 120 to refer to information elements stored in each table and receives an instruction from the control unit 120 to update the information elements in each table.

FIG. 7A is a diagram depicting the user attribute table 130A.

The user attribute table 130A associates and stores, for each user, date of birth, sex, a residential area, users related on the services of the SNS (friend information), and a matter of interest. The control unit 120 determines advertisement contents to distribute to the user based on attributes of the user stored in the user attribute table 130A. Further, the control unit 120 also determines user contents to distribute to the user based on the friend information. In addition, even if no information has been input into the user attribute table 130A, the control unit 120 can determine contents to distribute to the user as a matter of course. For example, the control unit 120 may select contents to distribute in accordance with a default setting or may select contents at random.

FIG. 7B is a diagram depicting the content distribution state table 130B.

The content distribution state table 130B stores, for each content distributed to the terminal 20, display order, a content ID, a content type, a display state, a display number, and a browsing state.

The display order includes an information element to indicate order in which contents are displayed on the terminal 20 from the information processing server 10. The order in which the contents are displayed is determined by the control unit 120 based on the user attribute table 130A and the content distribution target table 130D.

The content ID includes an identifier to identify content to distribute to the terminal 20.

The content type includes an information element to indicate a type of content such as a user post, a video advertisement, and a still image advertisement. Types of the user post include a post of text (user text post), a post of a still image such as a picture (user still image post), a post of a video (user video post), a post of a drawing such as a sticker (user drawing post).

The display state includes an information element to indicate a display state of content in the terminal 20. The "displayed" indicates that the content was displayed on the terminal 20 and is not currently displayed. The "being displayed in main-display area" indicates that the content is being displayed in the main-display area 50A. The "being displayed in sub-display area" indicates that the content is being displayed in the sub-display area 50B. The display state may be stored with a display time. In this case, a time when display started is stored in the display state of content being displayed, for example.

The display number includes an information element to indicate the number of times the content was displayed on the terminal 20. For the browsing state, "not browsed," "browsed," or "being browsed" is set.

The browsing state may be changed in accordance with the browsing state of a corresponding content.

FIG. 7C is a diagram depicting the display area setting table 130C. The display area setting table 130C includes a table set for each terminal 20. The display area setting table 130C stores "main-display area setting information" as information about the main-display area 50A and "sub-display area setting information" as information about the sub-display area 50B.

In the "main-display area setting information" and the "sub-display area setting information," the size (upper limit to lower limit) of each display area 50, the number of content display (upper limit), and the display size of content (upper limit to lower limit) indicating the display size of each content are stored.

FIG. 8 is a diagram depicting the content distribution target table 130D according to the first embodiment.

The content distribution target table 130D stores, for each content, a content ID, a content type, a browsing determination method, a display method, a distribution target, a distribution period, and a distribution number (upper limit).

The browsing determination method includes an information element used for the terminal 20 to determine whether content has been browsed. In the browsing determination method, a specific method for determining browsing is set for each content.

For example, if "video replay for 15 seconds or more" is set in the browsing determination method, when video content is replayed for 15 seconds or more in the terminal 20, the terminal 20 determines that the content has been browsed and changes the browsing state of the content to "browsed."

For example, if "view 50% or more" is set in the browsing determination method, when 50% or more of the total length of the video content is replayed in the terminal 20, the terminal 20 determines that the content has been browsed and changes the browsing state of the content to "browsed."

For example, if "selection of installation link" is set in the browsing determination method, when the terminal 20 receives a selection of the installation link 72 of an application of the content, the terminal 20 determines that the content has been browsed and changes the browsing state of the content to "browsed."

For example, if "selection of share menu" is set in the browsing determination method, when the terminal 20 receives a selection of the share menu 73 of an application of the content, the terminal 20 determines that the content has been browsed and changes the browsing state of the content to "browsed."

For example, if "display for 2 seconds or more" is set in the browsing determination method, when the content is displayed for 2 seconds or more in the terminal 20, the terminal 20 determines that the content has been browsed and changes the browsing state of the content to "browsed."

For example, if "display N times" (N is a natural number) is set in the browsing determination method, when the content is displayed N times or more in the terminal 20, the terminal 20 determines that the content has been browsed and changes the browsing state of the content to "browsed." This is because when the content is displayed a predetermined number of times or more on the terminal 20, it is highly likely that the content is recognized by the user of the terminal 20.

In addition, the above browsing determination methods may be combined as a matter of course.

Further, whether content is browsed or not may be determined from conditions when the content is displayed a plurality of times. For example, when the content is displayed a plurality of times in 24 hours, if a total amount of display time of the content reaches a predetermined amount of time or more, the content may be determined as browsed.

The display method includes an information element to specify a method for displaying content. In the display method, "main-display area and sub-display area" or "main-display area" is set, for example. Content for which the "main-display area and sub-display area" is set is displayed in the main-display area 50A and if the content is not browsed while the content is in the main-display area 50A, the content is displayed in the sub-display area 50B. Content for which the "main-display area" is set is displayed only in the main-display area 50A. When the terminal 20 receives an operation such as scrolling to display other contents from the user, the content to be displayed only in the main-display area 50A is removed from the main-display area 50A.

The distribution target includes an information element to specify a target to which content is distributed. In the distribution target, "male in his 20s," "Yokohama area," "post group X," "readers of timeline of user D," or the like is set. In the distribution target, a plurality of setting values may be set. For example, "male in his 20s" and "Yokohama area" are set.

The control unit 120 determines advertisement contents to distribute to the terminal 20 by using setting values in the "distribution target" included in the content distribution target table 130D such as the "male in his 20s" and the "Yokohama area" and using information in the user attribute table 130A such as the "date of birth," the "sex," the "residential area," and the like.

Further, the control unit 120 determines advertisement contents to distribute to the terminal 20 by using setting values in the "distribution target" included in the content distribution target table 130D such as the "post group X" and the "readers of timeline of user D" and using the "friend information" included in the user attribute table 130A.

The distribution period includes an information element to specify a period during which content is distributed. In the distribution number, an upper limit of distribution to the terminal 20 of the user is set. For example, in a case of advertisement content, the upper limit of the advertisement content may be set in order to prevent the same advertisement content from being excessively displayed on the terminal 20.

The input/output unit 140 receives various types of inputs from an administrator of the information processing server 10. The input/output unit 140 also displays a state of the information processing server 10.

(2) Terminal

The terminal 20 includes a communication unit 210, a display unit 220, an input unit 230, a control unit 240, and an information storage unit 250. The control unit 240 includes a determination unit 241 and a display control unit 245. The terminal 20 includes the CPU 201 and a memory such as the ROM 202 or the storage device 204 working in cooperation with each other so as to implement the communication unit 210, the display unit 220, the input unit 230, the control unit 240, the information storage unit 250, the determination unit 241, and the display control unit 245.

Functions of the terminal 20 work in cooperation with one another as follows. The display unit 220 displays content on the screen. The determination unit 241 determines whether content has been browsed. If the determination unit 241 determines that the content has not been browsed, the display control unit 245 causes the display unit 220 to display the content in a display form different from a previous display of the content.

The communication unit 210 transmits and receives signals to and from the information processing server 10. From the information processing server 10, the communication unit 210 receives content (user contents and advertisement contents) for the display unit 220 to display.

The communication unit 210 receives display order, a browsing determination method, and a display method of each content on the terminal 20 from the information processing server 10. This information is stored on the information storage unit 250.

From the information processing server 10, the communication unit 210 also receives "main-display area setting information" and "sub-display area setting information" as information about settings of the main-display area 50A and the sub-display area 50B formed on the display unit 220. The received "main-display area setting information" and "sub-display area setting information" is stored on the information storage unit 250.

When the communication unit 210 receives an instruction from the control unit 240, the communication unit 210 reports a display state and a browsing state of content to the information processing server 10.

When the display unit 220 receives an instruction from the display control unit 245, the display unit 220 displays content.

When the input unit 230 receives various types of operations from the user of the terminal 20, the input unit 230 reports the received operation to the control unit 240. For example, the input unit 230 receives a scrolling operation of the screen from the user.

The control unit 240 controls the functions of the terminal 20. The control unit 240 also controls applications running on the terminal 20.

The determination unit 241 refers to the information storage unit 250 and specifies the browsing determination method of each content. The determination unit 241 uses the specified browsing determination method to determine whether the content has been browsed, and stores a result of the determination on the information storage unit 250.

The display control unit 245 refers to the information storage unit 250 and specifies content to display, display order, and the display method of the content. The display control unit 245 controls the display unit 220 to display the specified content in the display order and the display method.

The display control unit 245 obtains the display state of the content from the display unit 220 and stores the display state on the information storage unit 250.

The display control unit 245 sends an instruction, to the communication unit 210, to report the display state and the browsing state of the content stored in the information storage unit 250 to the information processing server 10.

From the input unit 230, the display control unit 245 receives a report of an operation received from the user of the terminal 20, and sends an instruction to change display in accordance with the operation to the display unit 220.

For example, if a scrolling operation is received, the display control unit 245 sends an instruction to scroll the screen to the display unit 220.

The display control unit 245 sends, to the display unit 220, an instruction to form the main-display area 50A and the sub-display area 50B based on the "main-display area setting information" and the "sub-display area setting information." The display control unit 245 may form the main-display area 50A and the sub-display area 50B in response to occurrence of content to display in the sub-display area 50B.

The display control unit 245 refers to the information storage unit 250 and determines whether content has been browsed. If the content has not been browsed, the display control unit 245 performs display control in accordance with the display method of the content when the content is removed from the main-display area 50A by an operation such as scrolling. If "main-display area and sub-display area" is set in the display method of the content, the display control unit 245 sends an instruction to display the content in the sub-display area 50B to the display unit 220.

In this case, the display control unit 245 sends, to the display unit 220, an instruction to adjust the display size of the content from the display size set in the main-display area setting information to the display size set in the sub-display area setting information. In accordance with this, the display size of the content is adjusted in accordance with the sub-display area setting information and the content is displayed. In other words, the content is displayed in a different display form. The content may be reduced and displayed or a thumbnail of the content may be displayed in the sub-display area 50B.

The display control unit 245 sends an instruction to control display in the sub-display area 50B to the display unit 220 based on the sub-display area setting information.

For example, if the number of contents being displayed in the sub-display area 50B reaches a maximum value of the number of displayable contents and there is no space to display new content, the display control unit 245 may send, to the display unit 220, an instruction to remove the oldest content from contents being displayed in the sub-display area 50B.

Further, the display control unit 245 may refer to the display size of content set in the sub-display area setting information and send, to the display unit 220, an instruction to adjust the display size of contents being displayed in the sub-display area 50B.

The display control unit 245 may send an instruction to adjust the size the sub-display area 50B to the display unit 220.

The display control unit 245 may send, to the display unit 220, an instruction to enlarge the sub-display area 50B based on the sub-display area setting information. For example, the display control unit 245 may send an instruction to enlarge the sub-display area 50B while displaying the content with the same size without reduction or with an enlarged size. In this case, the content is displayed in the sub-display area 50B while having the same size as displayed in the main-display area 50A. However, the content is fixedly displayed in a part of the display unit 220 differently from display in the main-display area 50A. In other words, the content is displayed in a different display form.

In addition, because contents to display in the sub-display area 50B are not changed by an operation such as scrolling on the input unit 230, the sub-display area 50B may be called a fixed area. In this case, because contents to display in the main-display area 50A are changed by an operation such as scrolling on the input unit 230, the main-display area 50A may be called a changeable area.

The determination unit 241 determines whether other contents being displayed in the sub-display area 50B have been browsed. The browsing determination method for other contents being displayed in the sub-display area 50B may be the same as applied to the content displayed in the main-display area 50A or a different browsing determination method may be used. If the different browsing determination method is used, browsing determination methods to use in the main-display area 50A and the sub-display area 50B are reported from the information processing server 10.

The information storage unit 250 stores content, display order of content, the browsing determination method, the display method, and the like received from the information processing server 10. Further, the information storage unit 250 also stores display area setting information received from the information processing server 10. The information storage unit 250 refers to various types of stored information in response to an inquiry from the determination unit 241, the display control unit 245, and the like.

The information storage unit 250 receives a report of the display state and the display number of content from the display control unit 245 and stores reported information. The information storage unit 250 also receives a report of browsing determined by the determination unit 241 and stores reported information.

<Operation Procedure>

Figure 10:
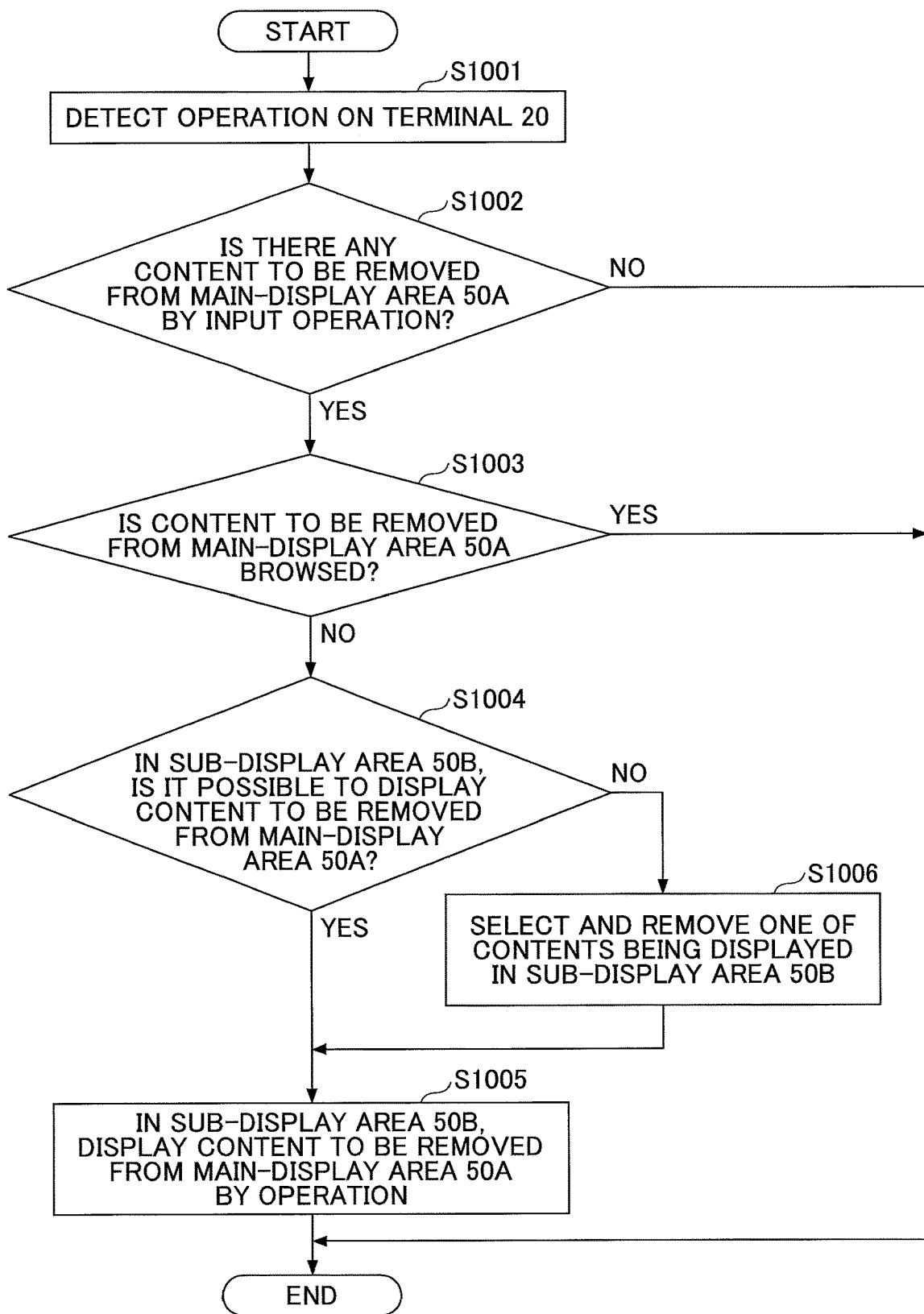
FIG. 10 is a flowchart of a procedure according to the first embodiment.

With reference to FIGS. 9 and 10, an operation procedure according to the first embodiment is described. FIG. 9 is a sequence diagram of the operation according to the first embodiment.

In step S901, in response to an instruction of the control unit 120 of a terminal 20A, the communication unit 210 transmits a content distribution request. The content distribution request includes an identifier of a user A of the terminal 20A.

In step S902, when the communication unit 110 of the information processing server 10 receives the content distribution request, the control unit 120 refers to the information storage unit 130 and determines contents to distribute to the user A and display order.

In step S903, in response to an instruction of the control unit 120, the communication unit 110 of the information processing server 10 distributes contents to the terminal 20A. A content distribution message includes the display order of the contents, the browsing determination methods, and the display methods of the contents. Further, the content distribution message may include setting information about the display area 50. The setting information about the display area 50 may be reported from the information processing server 10 to the terminal 20A before the contents are distributed. The setting information about the display area 50 includes setting information about the main-display area 50A and setting information about the sub-display area 50B.

In step S904, when the communication unit 210 of the terminal 20A receives the contents, the display order of the contents, the browsing determination methods, and the display methods of the contents, the display control unit 245 causes the display unit 220 to display the contents in the display order of the contents. The contents are displayed in accordance with the setting information about the main-display area 50A. The determination unit 241 determines whether the displayed contents have been browsed. Based on a result of the determination of the determination unit 241, the display control unit 245 performs display control. Specifically, the display control unit 245 causes the display unit 220 to display, based on the reported display method, contents determined as having not been browsed. For example, in a case of content for which "main-display area and sub-display area" is set in the display method, the display control unit 245 causes the sub-display area 50B to display the content when the content is removed (namely, deleted) from the main-display area 50A. In this case, the content is displayed in accordance with the setting information about the sub-display area 50B.

In step S905, the communication unit 210 of the terminal 20A transmits a content distribution request to the information processing server 10. The content distribution request includes the identifier of the user A, the display state, and the browsing state of the contents.

In step S906, when the communication unit 110 of the information processing server 10 receives the content distribution request, the control unit 120 reports the received display state and browsing state of the contents to the information storage unit 130 and causes the information storage unit 130 to update the content distribution state table 130B. In accordance with this, the display state, the display number, and the browsing state in the content distribution state table 130B are updated.

In step S907, the control unit 120 of the information processing server 10 determines new contents to distribute to the terminal 20 of the user A based on the updated content distribution state table 130B and the like.

In step S908, the communication unit 110 of the information processing server 10 distributes the contents to the terminal 20A based on an instruction of the control unit 120. A description of this process is omitted because the process is the same as in step S903.

FIG. 10 is a flowchart of a procedure according to the first embodiment. The flowchart of FIG. 10 shows the procedure of display control in the terminal 20.

In step S1001, the input unit 230 of the terminal 20 detects an operation on the terminal 20.

In step S1002, the display control unit 245 determines whether there is content to be removed from the main-display area 50A by an input operation. If there is such content to be removed (YES in S1002), the process proceeds to step S1003. If there is no content to be removed (NO in S1002), the process ends.

In step S1003, the determination unit 241 determines whether the content to be removed has been browsed. The determination unit 241 determines whether the content to be removed has been browsed based on the browsing determination method set for each content. If the content to be removed has not been browsed (NO in step S1003), the determination unit 241 reports this information to the display control unit 245.

In step S1004, the display control unit 245 determines whether the content to be removed can be displayed in the sub-display area 50B. In this case, it is assumed that for the content to be removed, "main-display area and sub-display area" is set in the display method. If the display is possible (YES in step S1004), the process proceeds to step S1005. If the display is impossible (NO in step S1004), the process proceeds to step S1006. Examples of the impossible case include a case where contents are already displayed in the sub-display area 50B to its maximum displayable number. In addition, the maximum number of displayable contents is determined in accordance with setting information about the sub-display area 50B.

In step S1005, the display control unit 245 sends, to the display unit 220, an instruction to display the content in the sub-display area 50B, the content being removed by the operation. The display unit 220 displays the content in the sub-display area 50B and the process ends. In addition, in the sub-display area 50B, the content is displayed with the display size determined in accordance with the setting information about the sub-display area 50B. The content may be displayed as a thumbnail or the like in the sub-display area 50B.

In step S1006, the display control unit 245 selects and removes one of contents being displayed in the sub-display area 50B. For example, content being displayed longest in the sub-display area 50B may be selected.

<Screen Display>

FIGS. 11A and 11B are diagrams depicting a screen display (third example) of the terminal 20 according to the first embodiment. With reference to FIGS. 11A and 11B, the display method of content in the sub-display area 50B is described.

As described above, the display control unit 245 of the terminal 20 can reduce and display content in the sub-display area 50B as shown in FIGS. 2A to 3B. In addition to the size reduction and display of the content, in the sub-display area 50B, the content may be displayed with the same size as displayed in the main-display area 50A as shown in FIGS. 11A and 11B.

FIG. 11A shows that the content 40B is displayed with the same size as displayed in the main-display area 50A in the display unit 220 of the terminal 20.

When the input unit 230 receives an operation such as scrolling from the user, the display control unit 245 determines that the content 40B that has not been browsed is displayed in the sub-display area 50B and causes the display unit 220 to form the sub-display area 50B. The display unit 220 forms a part of the main-display area 50A to be the sub-display area 50B. The display control unit 245 sends, to the display unit 220, an instruction to display the content 40B without size reduction in the formed sub-display area 50B.

By performing display in this manner, a possibility that the content 40B will attract attention of the user of the terminal 20 is improved in comparison with a case where the content 40B is reduced and displayed in the sub-display area 50B. In addition, because a part of the screen is occupied by specific content, preferably, the display control unit 245 removes the content being displayed from the sub-display area 50B after a predetermined time has elapsed since the content is displayed in the sub-display area 50B and returns the entire area of the screen to the main-display area 50A. Alternatively, if there is another content 40 (such as content 40C) to display in the sub-display area 50B, the display control unit 245 may display the content 40C in the sub-display area 50B instead of the content 40B.

FIG. 11B shows that content is displayed without size reduction in the sub-display area 50B in the same manner as in FIG. 11A. The display control unit 245 may refer to the display area setting information reported from the information processing server 10 and enlarge the size of the sub-display area 50B. In FIG. 11B, the content 40B and the content 40C are displayed in the sub-display area 50B while having the same size as displayed in the main-display area 50A. As shown in FIG. 11B, a plurality of contents 40 may be displayed in the sub-display area 50B without size reduction. Preferably, after content has been displayed in the sub-display area 50B for a predetermined time, the content being displayed in the sub-display area 50B is removed in the same manner as in FIG. 11A.

The terminal 20 may employ one of the display controlling methods shown in FIGS. 2A to 2C and FIGS. 11A and 11B based on an explicit instruction from the information processing server 10 or determine the sizes of the main-display area 50A and the sub-display area 50B and the sizes of contents displayed in the areas based on the display area setting information.

In the above description, the sub-display area 50B serving as a display area for fixed display is formed on an upper part of the screen of the terminal 20. However, it is possible to set the sub-display area 50B on a given area on the screen. Further, a plurality of areas on the screen may be set as the sub-display area 50B.

Figure 12:
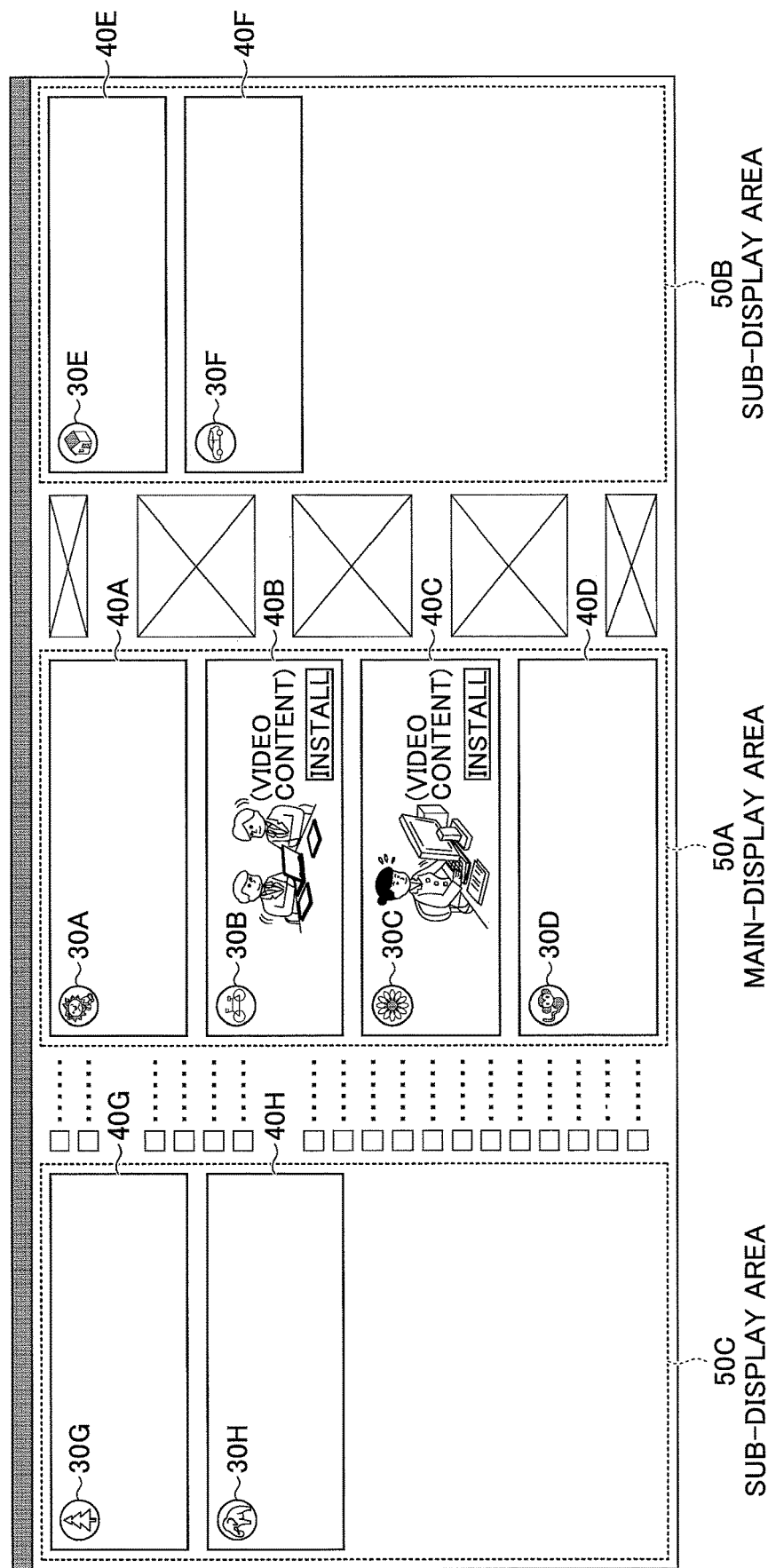
FIG. 12 is a diagram depicting a screen display (fourth example) of the terminal according to the first embodiment.

FIG. 12 is a diagram depicting a screen display (fourth example) of the terminal 20 according to the first embodiment. If the terminal 20 has a wider screen as in a PC or the like compared with a smartphone, the display area 50 may be set as shown in FIG. 12.

In FIG. 12, the main-display area 50A is formed at the center of the screen and the sub-display area 50B is formed on both side of the screen.

When contents are displayed on the terminal 20, even if the user changes contents to display by an operation such as scrolling as in the first embodiment, some of the contents continue to be displayed in the sub-display area 50B. Accordingly, the user feels like contents remain on the screen and a possibility of attracting attention of the user is improved.

Second Embodiment

In the following, a second embodiment is described. Descriptions of features common to the first and second embodiments are omitted and only a different feature will be described.

<Functional Configuration>

FIG. 13 is a diagram depicting a content distribution target table 130E according to the second embodiment.

The information storage unit 130 according to the second embodiment stores the content distribution target table 130E shown in FIG. 13. In the content distribution target table 130E according to the second embodiment, for each content, information elements indicating the display number and the display form are stored in association with each other.

For the information element indicating the display form, display by highlighting (emphatically displaying) the whole or a part of contents to distribute, display by enlarging content, display of a specific part of content in a thumbnail, display of content with a predetermined animation, display in combination of these display forms, or the like is set. The "part" of content includes an outer frame of the content, the replay menu 71, the installation link 72, and the share menu 73, for example. The predetermined animation includes display of the content together with a character of an animation set in advance by the user, for example.

In the content distribution target table 130E shown in FIG. 13, when content having the content ID "ZZZ" is displayed in its third display, the display form is set to "JJ." If the "JJ" indicates highlighting the outer frame of the content having the content ID "ZZZ" in red, the terminal 20 highlights the outer frame in red when displaying the content having the content ID "ZZZ" in the third display.

The control unit 120 of the information processing server 10 determines contents to distribute to the terminal 20 using the user attribute table 130A, the content distribution state table 130B, and the content distribution target table 130E stored in the information storage unit 130.

Further, the control unit 120 determines the display forms of the contents when the contents will be displayed next on the terminal 20 using the "display number" in the content distribution state table 130B and the "display form" in the content distribution target table 130E. The control unit 120 distributes the contents via the communication unit 110. Further, the control unit 120 reports the display forms of the contents to the terminal 20 via the communication unit 110.

The communication unit 210 of the terminal 20 receives the contents and the display forms of the contents. The display control unit 245 displays the contents in accordance with the received display forms of the contents.

The control unit 120 of the information processing server 10 can refer to the "friend information" of the user A to identify a user related to the user A and identify contents browsed by the user related to the user A from the content distribution state table 130B of the user related to the user A.

The control unit 120 of the information processing server 10 may report content browsing states of the related user when distributing contents via the communication unit 110.

Further, the content browsing state of the related user may be reported to the terminal 20 of the user A together with display forms of the contents.

<Operation Procedure>

Figure 15:
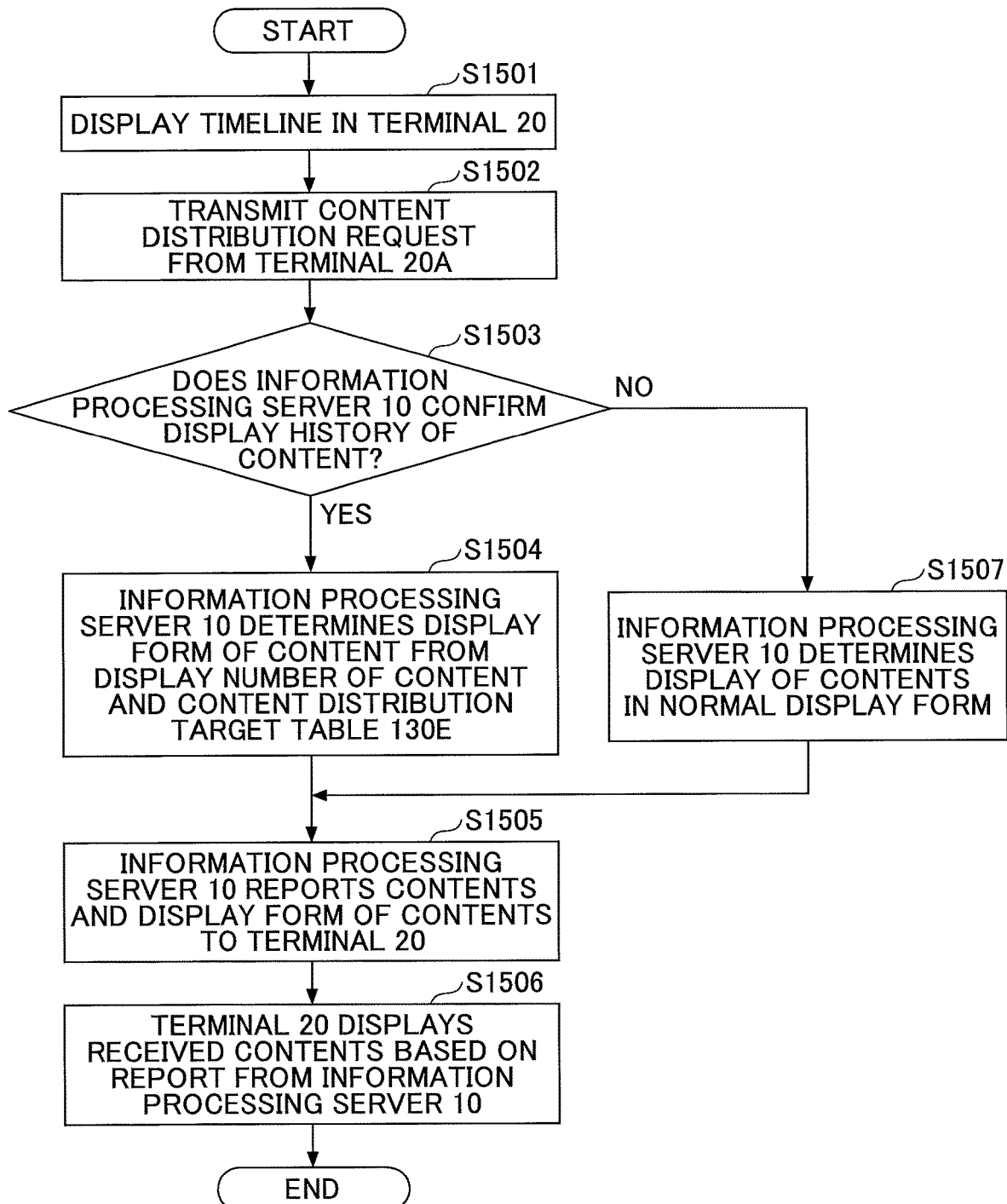
FIG. 15 is a flowchart of a procedure according to the second embodiment.

With reference to FIGS. 14 and 15, an operation procedure according to the second embodiment is described.

FIG. 14 is a sequence diagram of the operation according to the second embodiment.

In step S1401, in response to an instruction of the control unit 120 of the terminal 20A, the communication unit 210 transmits a content distribution request. The content distribution request includes an identifier of the user A of the terminal 20A.

In step S1402, when the communication unit 110 of the information processing server 10 receives the content distribution request, the control unit 120 refers to the information storage unit 130 and determines contents to distribute to the user A and display order. Further, the control unit 120 refers to the content distribution state table 130B and the content distribution target table 130E stored in the information storage unit 130 and determines, based on the display numbers of the contents, the display forms of the contents to distribute. In addition, the control unit 120 may identify browsing states of the contents to distribute by other users and the control unit 120 may determine distribution of the identified browsing states together with the contents.

In step S1403, in response to an instruction of the control unit 120, the communication unit 110 of the information processing server 10 distributes determined contents to the terminal 20A. A content distribution message includes the display order of the contents and the display forms of the contents. The content distribution message may include the browsing states of the contents by other users.

In step S1404, the display control unit 245 of the terminal 20A sends, to the display unit 220, an instruction to display the distributed contents in accordance with the reported display forms.

FIG. 15 is a flowchart of a procedure according to the second embodiment.

In step S1501, the display control unit 245 of the terminal 20A sends an instruction to display distributed contents in timeline menus.

In step S1502, the communication unit 210 of the terminal 20A transmits a content distribution request based on the instruction of the display control unit 245. The content distribution request includes an identifier of the user A of the terminal 20A.

In step S1503, when the communication unit 110 of the information processing server 10 receives the content distribution request, the control unit 120 determines contents to distribute to the terminal 20A and display order of the contents. The control unit 120 also refers to the "display number" in the content distribution state table 130B stored in the information storage unit 130 and determines whether the contents have been displayed (confirmation of display history). The "zero" set in the "display number" indicates that the content has not been displayed on the terminal 20. If the content has display history (YES in step S1503), the process proceeds to step S1504. If the content does not have display history (NO in step S1503), the process proceeds to step S1507.

In step S1507, the control unit 120 of the information processing server 10 refers to the content distribution state table 130B and the content distribution target table 130E and determines the display form of the content.

In step S1505, when the communication unit 110 of the information processing server 10 receives an instruction of the control unit 120, the communication unit 110 reports the contents, the display order of the contents, and the determined display forms of the contents to the terminal 20.

In step S1506, the display control unit 245 of the terminal 20 causes the display unit 220 to perform display based on the report from the information processing server 10.

In step S1507, the control unit 120 of the information processing server 10 determines that the content is to be displayed in a normal display form. In addition, the "1" in the "display form" in the content distribution target table 130E indicates a display form by which the content is displayed for the first time. When the process in this flowchart is performed, it is assumed that a value indicating a display form of "normal display" is set. When the step S1507 is completed, the process proceeds to step S1505.

In the above embodiment, the information processing server 10 stores the display number in association with the display form per each content. However, the information processing server 10 may store the distribution number of content in association with the display form per each user and send an instruction to display the content to the terminal 20 based on the stored information. In this case, information such that content in its third display for the user A will be displayed in "red" is stored in the information processing server 10, for example. Further, each time the information processing server 10 distributes content, the information processing server 10 may select one of display forms from predetermined display form patterns and report the selected display form to the terminal 20.

<Screen Display>

With reference to FIGS. 16A to 16E and FIG. 17, display on the terminal 20 according to the second embodiment is described. FIGS. 16A to 16E are diagrams depicting the screen display (first example) of the terminal according to the second embodiment.

Figure 16C:
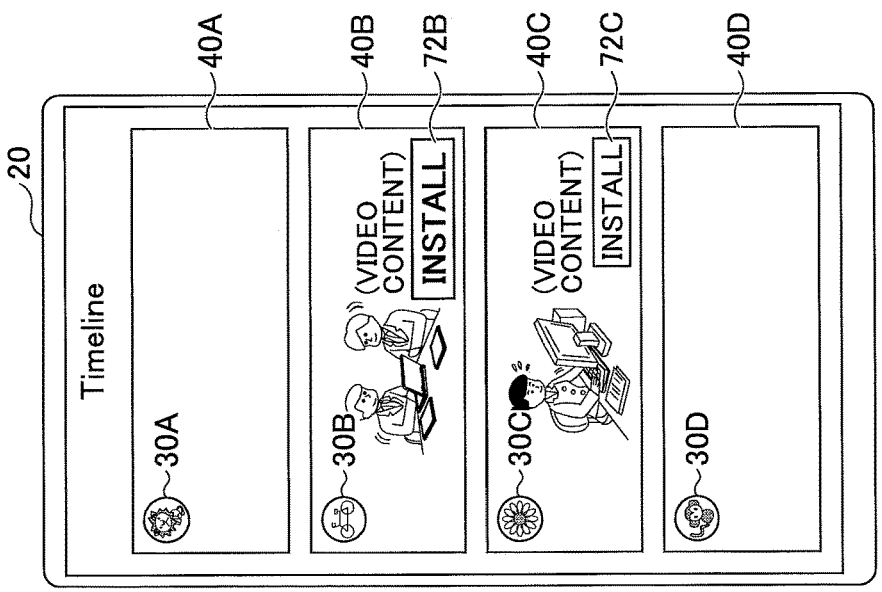
FIG. 16C is a diagram depicting a screen display (first example) of the terminal according to the second embodiment.
Figure 16B:
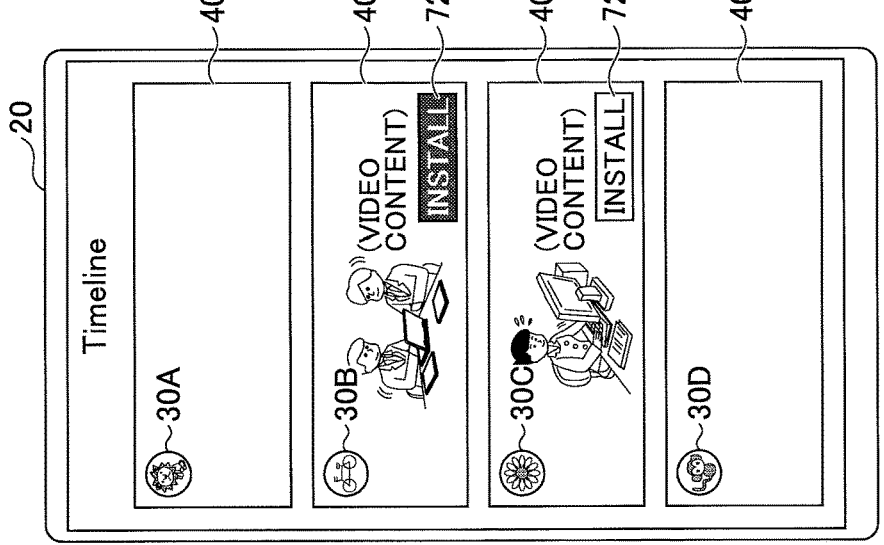
FIG. 16B is a diagram depicting a screen display (first example) of the terminal according to the second embodiment.
Figure 16A:
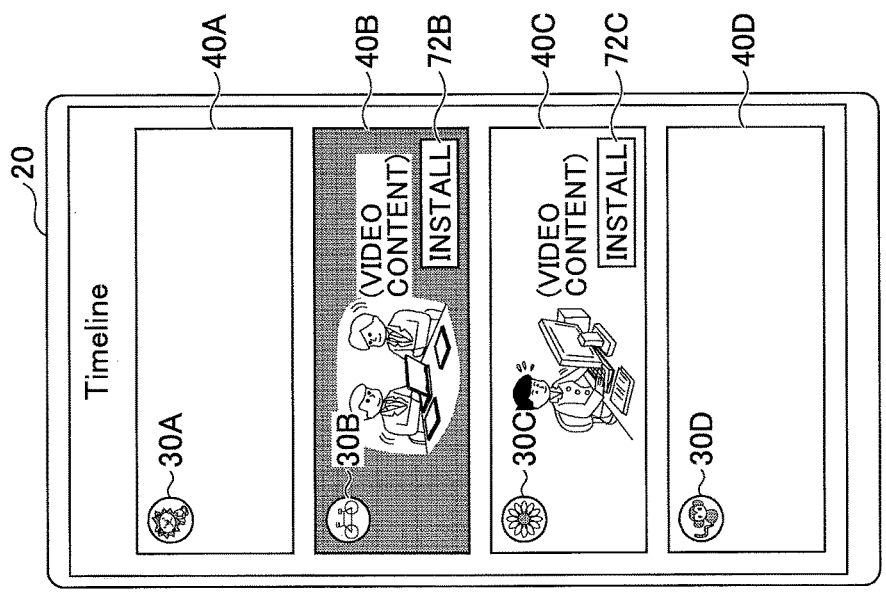
FIG. 16A is a diagram depicting a screen display (first example) of the terminal according to the second embodiment.

FIG. 16A shows that based on an instruction of a display form from the information processing server 10, the content 40B is highlighted and displayed by the display unit 220.

The information processing server 10 may send an instruction to change the display form of a part of content to attract attention of the user.

FIG. 16B shows that based on an instruction of a display form from the information processing server 10, an installation link 72B of the content 40B is highlighted and displayed by the display unit 220. Further, FIG. 16C shows that based on an instruction of a display form from the information processing server 10, the installation link 72B of the content 40B is enlarged and displayed by the display unit 220.

Figure 16E:
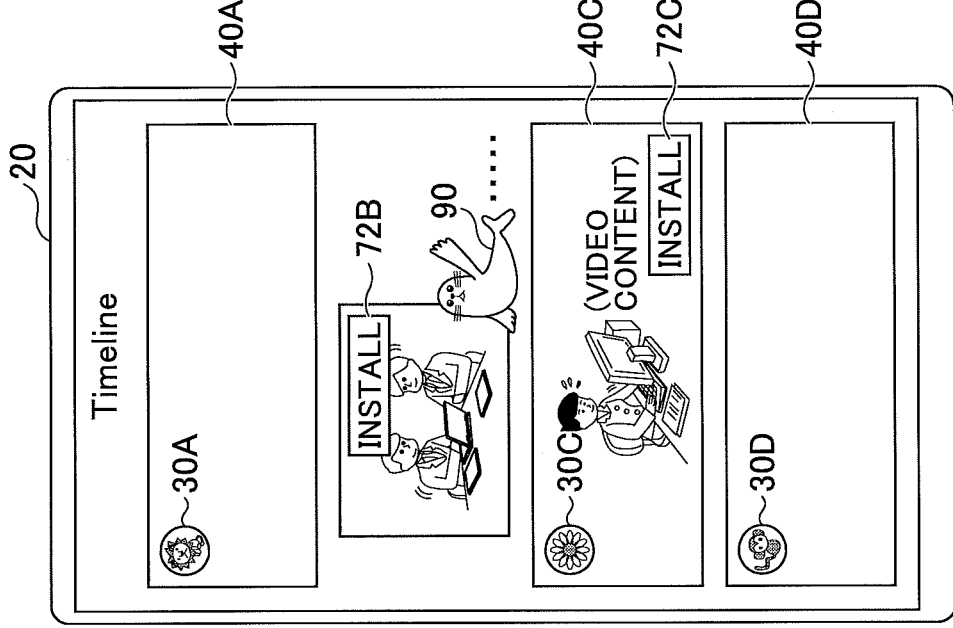
FIG. 16E is a diagram depicting a screen display (first example) of the terminal according to the second embodiment.
Figure 16D:
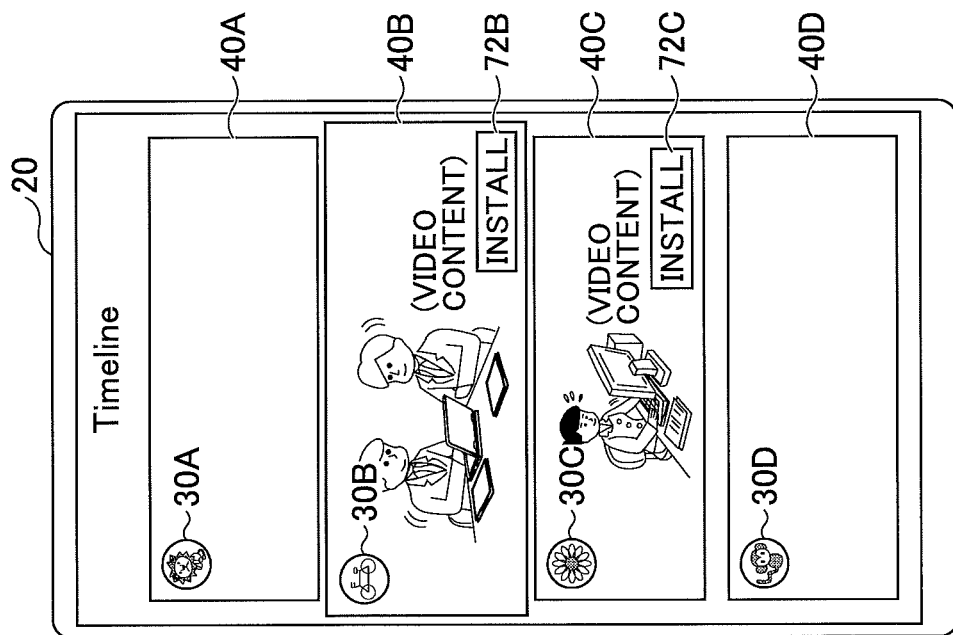
FIG. 16D is a diagram depicting a screen display (first example) of the terminal according to the second embodiment.

FIG. 16D shows that based on an instruction of a display form from the information processing server 10, the content 40B is enlarged and displayed by the display unit 220.

The information processing server 10 may send an instruction to display the content together with an animation of a character 90 in order to attract attention of the user.

FIG. 16E shows that based on an instruction of a display form from the information processing server 10, the content 40B is displayed together with an animation of the character 90. In addition, the character 90 may be set for each user.

Figure 17:
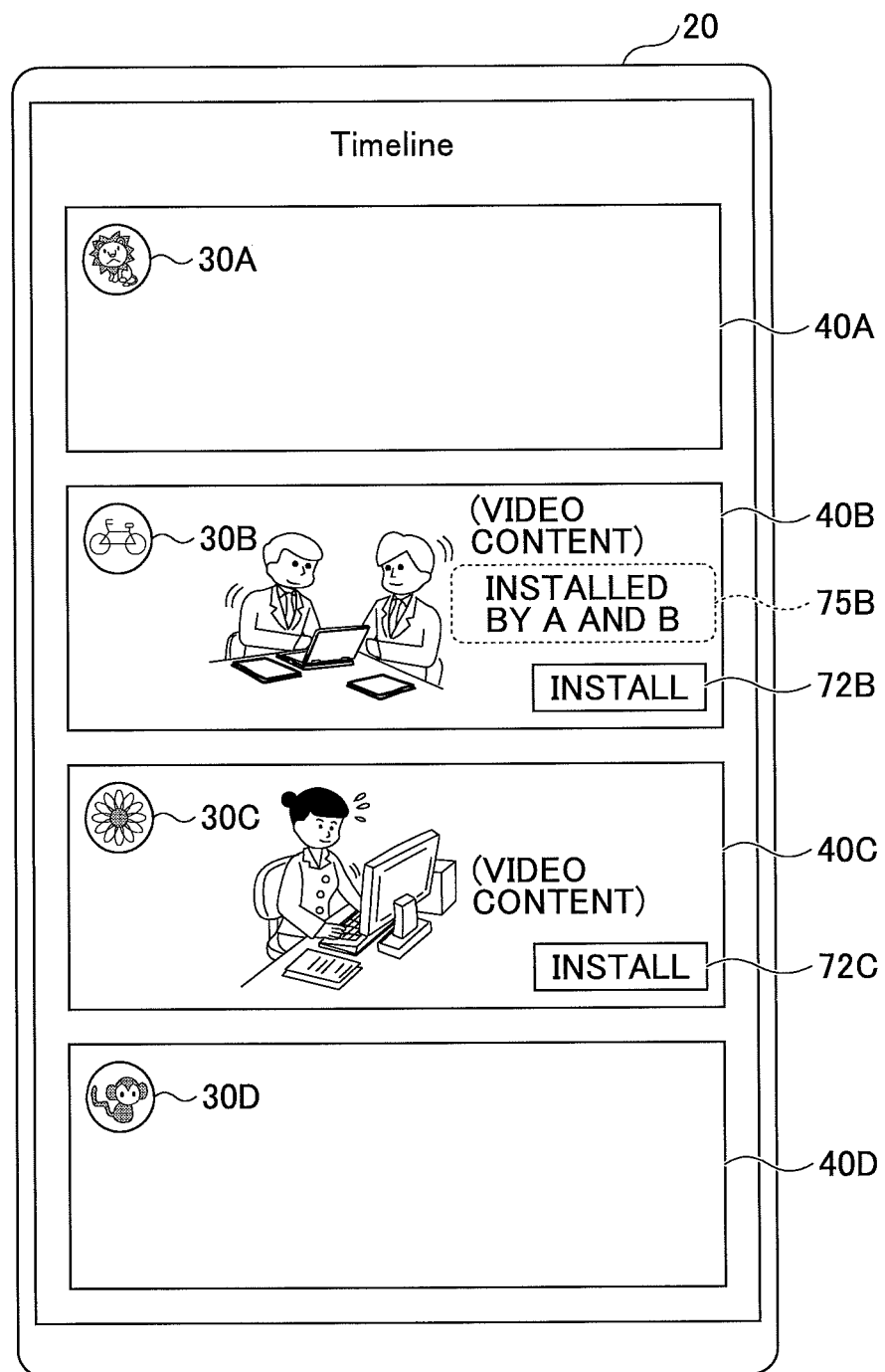
FIG. 17 is a diagram depicting a screen display (second example) of the terminal according to the second embodiment.

FIG. 17 is a diagram depicting the screen display (second example) of the terminal according to the second embodiment.

FIG. 17 shows that based on an instruction of a display form from the information processing server 10, the content 40B is displayed together with a browsing state 75B of the content 40B by other users.

In addition, if an instruction of both a display form such as highlighting and the browsing state 75B is received from the information processing server 10, the display control unit 245 of the terminal 20 causes the display unit 220 to highlight a specified part of the content 40 and display the content 40 together with the browsing state 75B.

[Others]

In the second embodiment, the terminal 20 determines whether content distributed to the terminal 20 has been browsed using a browsing determination method reported from the information processing server 10. However, the information processing server 10 may determine whether the content has been browsed. In this case, the information processing server 10 obtains a display state of content and an operation on the content from the terminal 20 and determines whether the content has been browsed.

The information processing server 10 may cause the sub-display area 50B to display the content depending on the importance of the content, cause the sub-display area 50B to display the content for a predetermined time or more, or select a display form such as highlighting to emphatically display the content.

For example, in a case of user contents that have been browsed by a predetermined number of other users or more or for which sharing is selected or in a case of advertisement contents for which an advertising fee not less than a predetermined amount of money is paid by an advertiser, the information processing server 10 may display such contents in the sub-display area 50B or in an emphasized display form such as highlighting in order to attract attention of the user to such contents.

The first embodiment and the second embodiment may be combined and performed between the information processing server 10 and the terminal 20 as a matter of course.

The information processing server 10 is an example of an information processing apparatus. Functions of the information processing server 10 may be mounted on other hardware. In this case, the functions of the information processing server 10 are implemented when the functions mounted on other hardware work in cooperation. For example, the information processing server 10 may obtain information from the information storage unit 130 mounted on another device to implement the above operation.

The communication unit 110 is an example of a distribution unit and a communication unit. The control unit 120 is an example of a display control unit.

A storage medium that stores a program of software for implementing functions in the above embodiments may be provided to the information processing server 10 and the terminal 20. The above embodiments are achieved when the information processing server 10 and the terminal 20 read and execute the program stored in the storage medium as a matter of course. In this case, the storage medium stores a program that causes the information processing server 10 and the terminal 20 to perform a method for controlling display of information about users of SNS in chronological order.

Specifically, the storage medium stores a program that causes the terminal 20 to perform a method including a step of displaying content on a screen, a step of determining whether the content has been browsed, and a step of changing display of the content from a first display area to a second display area if it is determined that the content has not been browsed.

Further, the storage medium stores a program that causes the information processing server 10 to perform a method including a step of distributing content to the terminal 20, a step of reporting a condition to determine whether the content has been browsed to the terminal 20, and a step of changing display of the content from a first display area to a second display area if it is determined that the content has not been browsed.

The program per se read from the storage medium implements functions in the above embodiments.

Further, the functions in the above embodiments are not merely implemented when a computer device executes the readout program. An operating system (OS) or the like operating on the computer device may perform a part of or the entirety of an actual process in accordance with an instruction of the program. Further, the functions of the above embodiments may be implemented by the process as a matter of course.

While the preferred embodiments are described, the present invention is not limited to these embodiments. Various types of variations and replacements may be added without departing from the scope of the present invention.

According to an embodiment of the present invention, it is possible to prompt a user to browse content that has not been browsed among contents distributed to a terminal.

Further, the present invention is not limited to these embodiments, and various variations and modifications may be made without departing from the scope of the present invention.

The present application is based on and claims the benefit of priority of Japanese Priority Application No. 2015-221042 filed on Nov. 11, 2015, the entire contents of which are hereby incorporated by reference.

What is claimed is:

1. A display controlling method for controlling a terminal including a processor and a screen, the method comprising:
    first-causing, by the processor, the screen to display a plurality of contents including a first content item in a first display area on the screen, the first content item relating to video content;
    receiving, by the processor, instructions from a user to scroll the plurality of contents including the first content item displayed in the first display area;
    second-causing, by the processor, the screen to scroll the plurality of contents displayed in the first display area based on the instructions such that the first content item is not displayed in the first display area;
    in response to the first content item being not displayed in the first display area by the second-causing, first-determining, by the processor, whether the first content item is viewed based on at least one of
        whether the video content related to the first content item has been replayed on the terminal based on an input of the user to the first content item,
        whether the video content has been shared by the user, or
        whether the video content is replayed based on a selection of a link associated with and included in the first content item by the user;
    third-causing, by the processor, the first content item to move from the first display area to a second display area, a size of which is adjustable, based on the instructions and a first result of the first-determining indicating that the first content item is not viewed; and
    displaying the moved first content item in the adjustable second display area in a different display form than a display form of the first content item in the first display area.

2. The display controlling method as claimed in claim 1, wherein
    the first-causing includes causing the first content item to be dynamically displayed in the first display area, and the third-causing includes causing the first content item to be fixedly displayed in the second display area for a first time.

3. The display controlling method as claimed in claim 1, further comprising:
    second-determining whether a second content item displayed in the second display area satisfies a condition; and
    removing the second content item from the screen of the terminal based on a second result of the second-determining indicating that the second content item satisfies the condition.

4. The display controlling method as claimed in claim 3, wherein the condition is whether the second content item is viewed for a first time or more or whether the second content item is displayed a first number of times or more.

5. The display controlling method as claimed in claim 1 further comprising:
    fourth-causing, by the processor, the screen to move a second content item from the second display area to the first display area in response to a certain operation on the first display area.

6. The display controlling method as claimed in claim 1, wherein
    the first content item is displayed in the second display area with the display form of an enlarged display, a highlighted display, a thumbnail display, or a combination thereof.

7. The display controlling method as claimed in claim 6, wherein the third-causing includes causing the first content item to be displayed in the second display area together with a browsing state of the first content item by another user.

8. An information processing apparatus comprising:
    a memory configured to store computer readable instructions; and
    a Central Processing Unit (CPU) configured to execute the computer readable instructions to,
    distribute first content item to a terminal and control the terminal to display a plurality of contents including the first content item in a first display area of a screen of the terminal, the first content item relating to video content,
    receive instructions from a user to scroll the plurality of contents including the first content item displayed in the first display area such that the first content item is not displayed in the first display area,
    cause the screen to scroll the plurality of contents displayed in the first display area based on the instructions such that the first content item is not displayed in the first display area,
    in response to the first content item being not displayed in the first display area by causing the screen to scroll the plurality of contents, first report, to the terminal, a first determination result as to whether the first content item is viewed based on at least one of
        whether the video content related to the first content item has been replayed on the terminal based on an input of the user to the first content item,
        whether the video content has been shared by the user, or
        whether the video content is replayed based on a selection of a link associated with and included in the first content item by the user,
    receive display state information including information associated with the first determination result, and
    control the terminal to move the first content item from the first display area to a second display area, a size of which is adjustable, based on the instructions and the display state information indicating that the first content item is not viewed; and display the moved first content item in the adjustable second display area in a different display form than a display form of the first content item in the first display area.

9. The information processing apparatus as claimed in claim 8, wherein the CPU is configured to control the terminal such that the first display area dynamically displays the first content item, and the second display area fixedly displays the first content item for a second time.

10. The information processing apparatus as claimed in claim 8, wherein the CPU is configured to second-report, to the terminal, a second determination result as to whether the first content item displayed in the second display area satisfies a condition, and control the terminal to remove the first content item from the screen of the terminal based on the second determination result indicating that the first content item displayed in the second display area satisfies the condition.

11. The information processing apparatus as claimed in claim 10, wherein the condition is whether the first content item is viewed for a second time or more or whether the first content item is displayed a number of times or more.

12. The information processing apparatus as claimed in claim 8, wherein the CPU is further configured to control the terminal to move the first content item displayed in the second display area back to the first display area in response to a certain operation on the first display area.

13. The information processing apparatus as claimed in claim 8, wherein the CPU is configured to control the first content item to be displayed in the second display area, wherein the display form of the first content item includes an enlarged display, a highlighted display, a thumbnail display, or a combination thereof.

14. The information processing apparatus as claimed in claim 13, wherein the CPU is configured to control the first content item to be displayed in the second display area together with a browsing state of the first content item by another user.

15. A non-transitory computer-readable storage medium storing a computer-readable program that, when executed by a terminal, causes the terminal to perform a process comprising:

causing, by a processor, a screen to display a plurality of contents including a first content item in a first display area on the screen, the first content item relating to video content;

receiving, by the processor, instructions from a user to scroll the plurality of contents displayed in the first display area;

causing, by the processor, the screen to scroll the plurality of contents displayed in the first display area based on the instructions such that the first content item is not displayed in the first display area;

in response to the first content item being not displayed in the first display area by the causing the screen to scroll the plurality of contents, determining, by the processor, whether the first content item is viewed based on at least one of whether the video content related to the first content item has been replayed on the terminal based on an input of the user to the first content item, whether the video content has been shared by the user, or whether the video content is replayed based on a selection of a link associated with and included in the first content item by the user;

causing, by the processor, the first content item to move from the first display area to a second display area, a size of which is adjustable, based on the instructions and a result of the determining indicating that the first content item is not viewed; and displaying the moved first content item in the adjustable second display area in a different display form than a display form of the first content item in the first display area.

* * * * *